(12) United States Patent
Lee et al.

(10) Patent No.: US 10,156,896 B2
(45) Date of Patent: Dec. 18, 2018

(54) HEAD-WEARABLE ELECTRONIC DEVICE

(71) Applicant: SAMSUNG DISPLAY CO., LTD, Yongin, Gyeonggi-Do (KR)

(72) Inventors: Kwanghoon Lee, Anyang-si (KR); Mugyeom Kim, Hwaseong-si (KR); Anna Ryu, Hwaseong-si (KR); Hee Soo Yoo, Seoul (KR); Myoungjin Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/965,447

(22) Filed: Dec. 10, 2015

(65) Prior Publication Data
US 2016/0202753 A1 Jul. 14, 2016

(30) Foreign Application Priority Data

Jan. 14, 2015 (KR) .................. 10-2015-0007037

(51) Int. Cl.
G06F 3/01 (2006.01)
G02B 26/08 (2006.01)
(Continued)

(52) U.S. Cl.
CPC .......... G06F 3/011 (2013.01); G02B 26/0816 (2013.01); G02B 27/0093 (2013.01);
(Continued)

(58) Field of Classification Search
CPC ............ G02B 27/0172; G02B 27/0093; G02B 2027/0138; G02B 27/0179; G02B 27/283;
(Continued)

(56) References Cited

U.S. PATENT DOCUMENTS 8,294,994 B1 10/2012 Kelly
9,116,337 B1 * 8/2015 Miao .................. G02B 27/0172
(Continued)

FOREIGN PATENT DOCUMENTS

EP 1808722 A2 7/2007
EP 2642331 A1 9/2013
(Continued)

OTHER PUBLICATIONS

"High-efficiency Fabrication Technology for Switchable Mirror Devices Capable of Switching between Mirror and Transparent States" National Institute of Advanced Industrial Science and Technology (AIST; President: Tamotsu Nomakuchi), Translation of AIST press release on Feb. 14, 2012), Date the website updated Apr. 9, 2012.

(Continued)

Primary Examiner — Gerald Johnson
(74) Attorney, Agent, or Firm — H.C. Park & Associates, PLC

(57) ABSTRACT

A head-wearable electronic device includes a frame worn on a head of a user and an electro-optical device coupled to the frame. The electro-optical device includes a display module generating a data image, an optical module, and a camera module. The optical module includes a first switchable mirror layer and a second switchable mirror layer, each having a light transmittance that is controllable. The first switchable mirror layer provides the second switchable mirror layer with the data image generated by the display module and the second switchable mirror layer provides eye of the user with the data image provided from the first switchable mirror layer. The camera module provides an external image having information about the eye of the user corresponding to an operation of the first and second switchable mirror layers.

26 Claims, 23 Drawing Sheets

(51) Int. Cl.
*G02B 27/00* (2006.01)
*G02B 27/01* (2006.01)
*G06F 1/16* (2006.01)
*G06K 9/00* (2006.01)
*G02F 1/19* (2006.01)

(52) U.S. Cl.
CPC ..... *G02B 27/0172* (2013.01); *G02B 27/0176* (2013.01); *G02B 27/0179* (2013.01); *G02F 1/19* (2013.01); *G06F 1/163* (2013.01); *G06F 1/1639* (2013.01); *G06K 9/00604* (2013.01); *G02B 2027/014* (2013.01); *G02B 2027/0138* (2013.01); *G02B 2027/0161* (2013.01)

(58) Field of Classification Search
CPC .............. G02B 21/0032; G02B 27/286; G02B 17/0856; G02B 2027/0178; G02B 21/04; G02B 5/3066; G02B 27/0101; G02B 27/017; G06F 3/013; G06F 3/017; G06F 1/163; G06F 3/012; G06F 3/005
See application file for complete search history.

(56) References Cited

U.S. PATENT DOCUMENTS

| | | | |
|---|---|---|---|
| 2002/0036817 A1 | 3/2002 | Johnson et al. | |
| 2003/0165017 A1* | 9/2003 | Amitai | G02B 6/0018 359/636 |
| 2004/0212776 A1* | 10/2004 | Spitzer | G02B 27/0081 351/41 |
| 2012/0050140 A1 | 3/2012 | Border et al. | |
| 2012/0050493 A1 | 3/2012 | Ernst et al. | |
| 2012/0068913 A1 | 3/2012 | Bar-Zeef et al. | |
| 2013/0108229 A1 | 5/2013 | Starner et al. | |
| 2013/0207887 A1 | 8/2013 | Raffle et al. | |
| 2014/0092461 A1 | 4/2014 | Spitzer et al. | |
| 2014/0300632 A1 | 10/2014 | Laor | |
| 2015/0177864 A1* | 6/2015 | Wong | G02B 27/017 345/175 |
| 2015/0205133 A1* | 7/2015 | Sasaki | G02B 27/0172 345/8 |
| 2015/0354265 A1* | 12/2015 | Yoshimura | G02F 1/15 359/240 |
| 2015/0370071 A1* | 12/2015 | Alton | G02B 27/0172 349/11 |
| 2016/0062124 A1* | 3/2016 | Callier | G02C 7/00 351/178 |

FOREIGN PATENT DOCUMENTS

| | | |
|---|---|---|
| JP | 2010-224479 A | 10/2010 |
| JP | 2012-018414 A | 1/2012 |
| JP | 2012-159681 A | 8/2012 |
| JP | 5035465 B2 | 9/2012 |
| JP | 5133925 B2 | 1/2013 |
| KR | 10-2001-0054281 A | 7/2001 |
| KR | 10-0634831 B1 | 10/2006 |
| KR | 10-2009-0053316 A | 5/2009 |
| KR | 10-0928226 B1 | 11/2009 |
| KR | 10-2013-0127472 A | 11/2013 |
| KR | 1020130127472 A | 11/2013 |
| KR | 10-2014-0045292 A | 4/2014 |
| KR | 1020140045292 B1 | 4/2014 |
| KR | 10-2014-0066258 A | 5/2014 |
| KR | 1020140066258 A | 5/2014 |
| WO | 2004/057557 A1 | 7/2004 |
| WO | 2013/133990 A1 | 9/2013 |

OTHER PUBLICATIONS

"Liquid Crystal Switchable Mirror" developed by Kent Optronics; Le Li, the CEO.
Switchable Mirror / Switchable Glass by Kent Optronics, May 6, 2015.
European Search Report issued by European Patent Office on Jun. 6, 2016 in connection with European Patent Application No./Patent No. 16150985.6-1562, which also claims Korean Patent Application Serial No. 10-2015-0007037 as its priority document.
"Liquid Crystal Switchable Mirror", Kent Optronics, Inc; USA.
"Switchable Mirror / Switchable Glass", URL: http://www.kentoptronics.com/mirror.html, dated Feb. 22, 2016, Kent Optronics, Inc, USA.
Kazuki Tajima, "High-efficiency Fabrication Technology for Switchable Mirror Devices Capable of Switching between Mirror and Transparent States", Apr. 9, 2012, National Institute of Advanced Industrial Science and Technology(AIST), USA.
Examination Report dated Jan. 30, 2018 issued in European Patent Application No. 16 150 985.6.

* cited by examiner

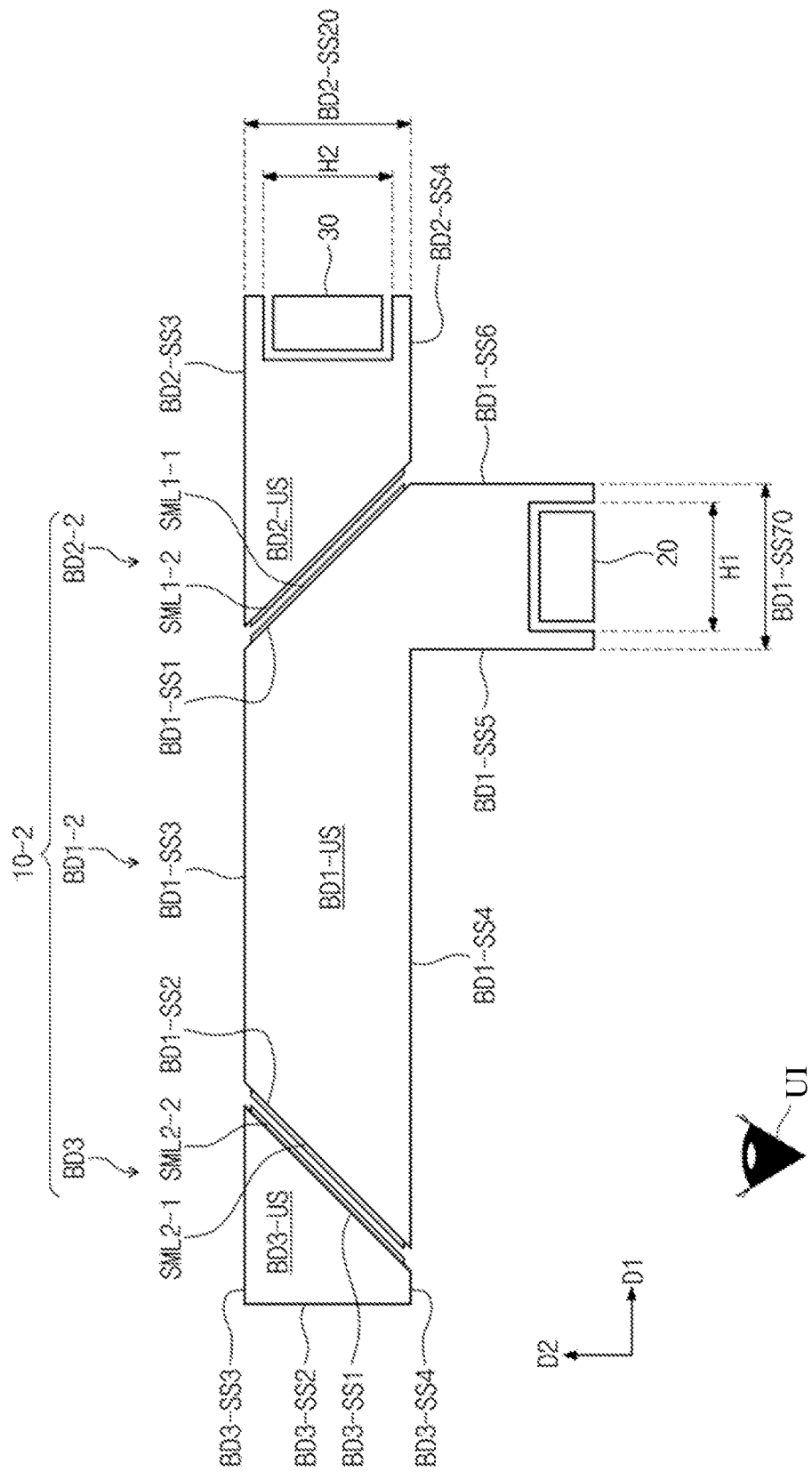

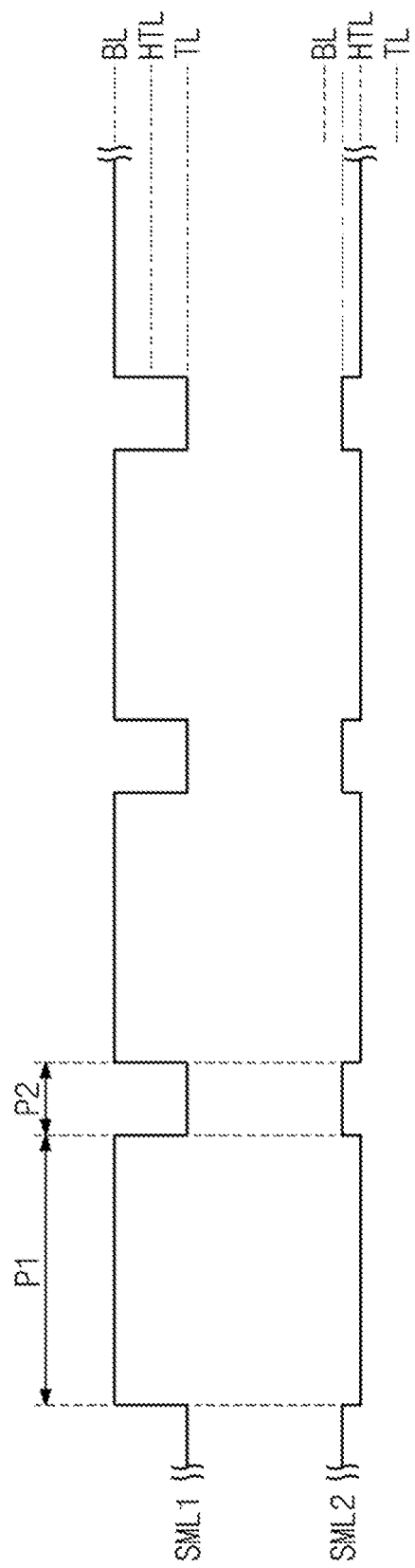

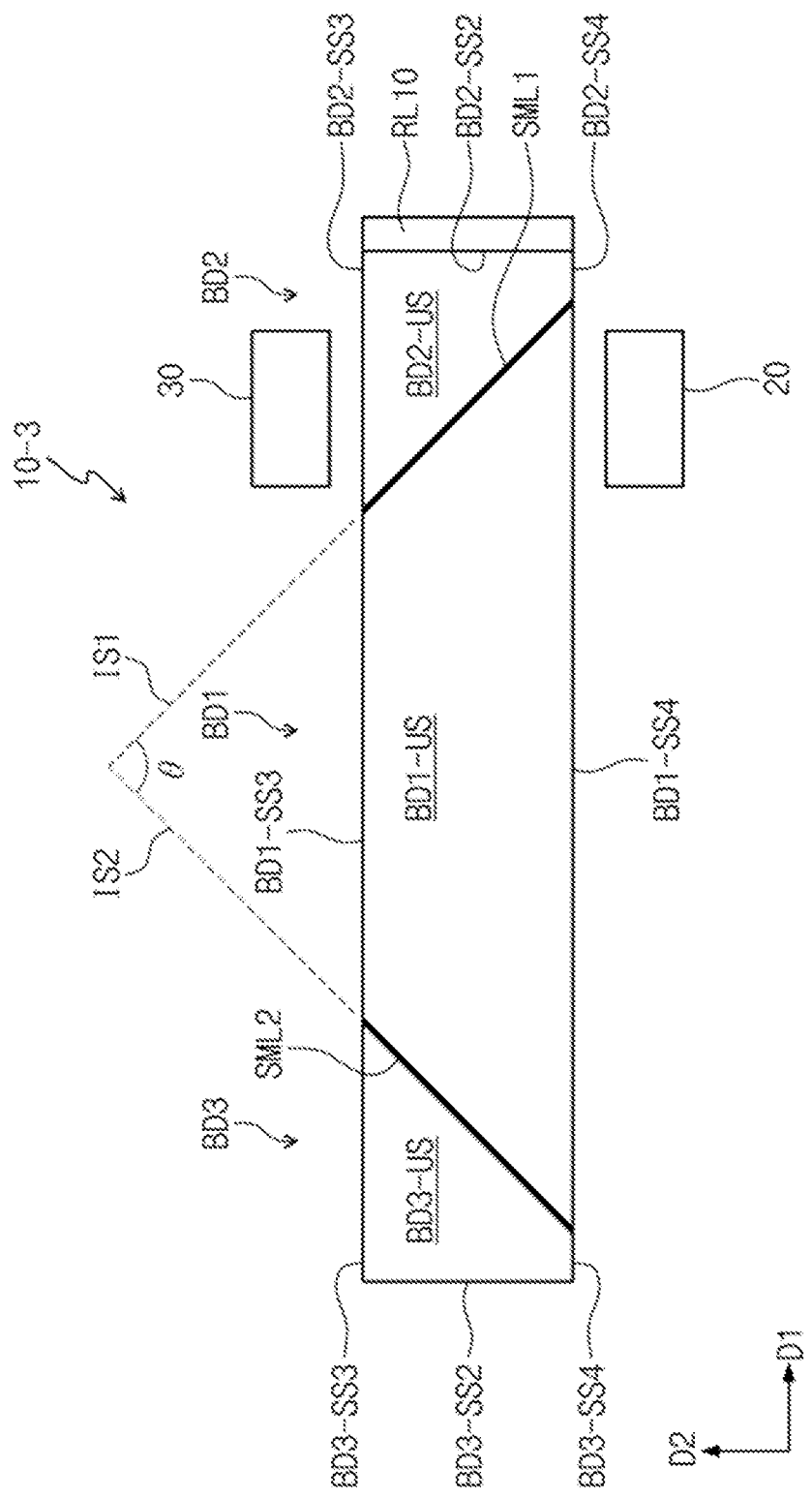

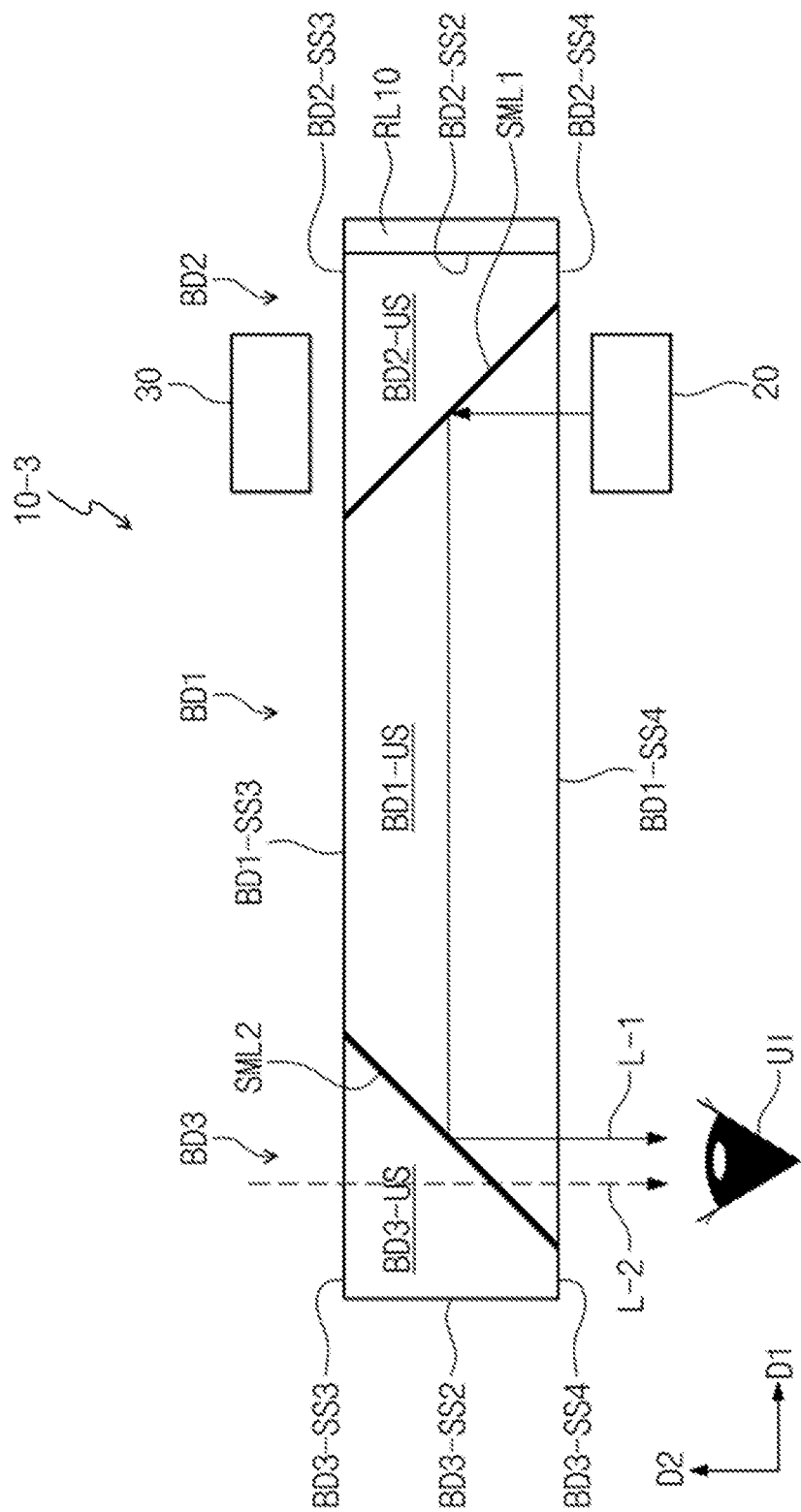

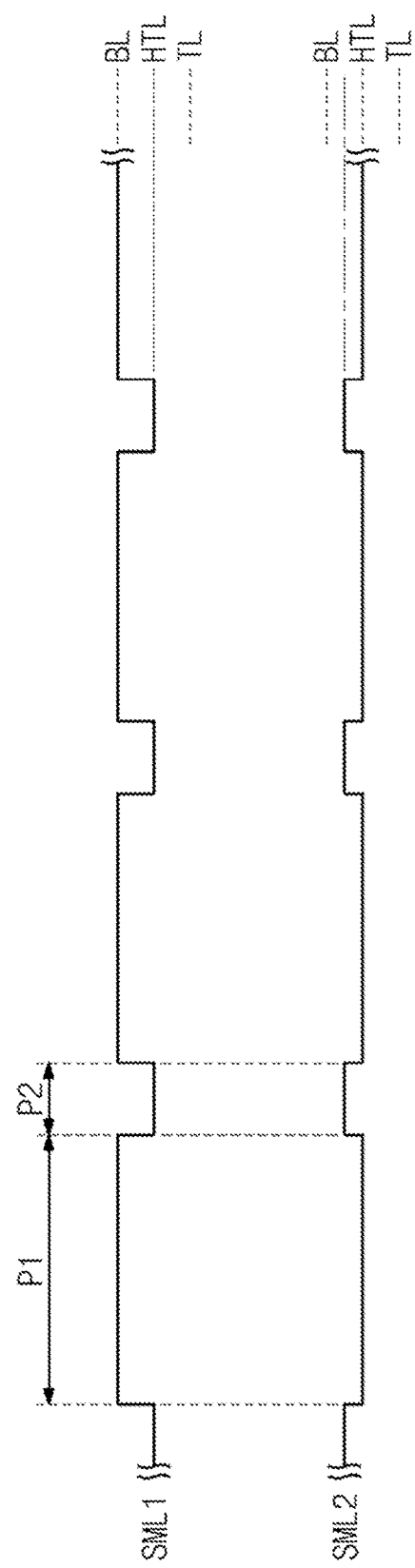

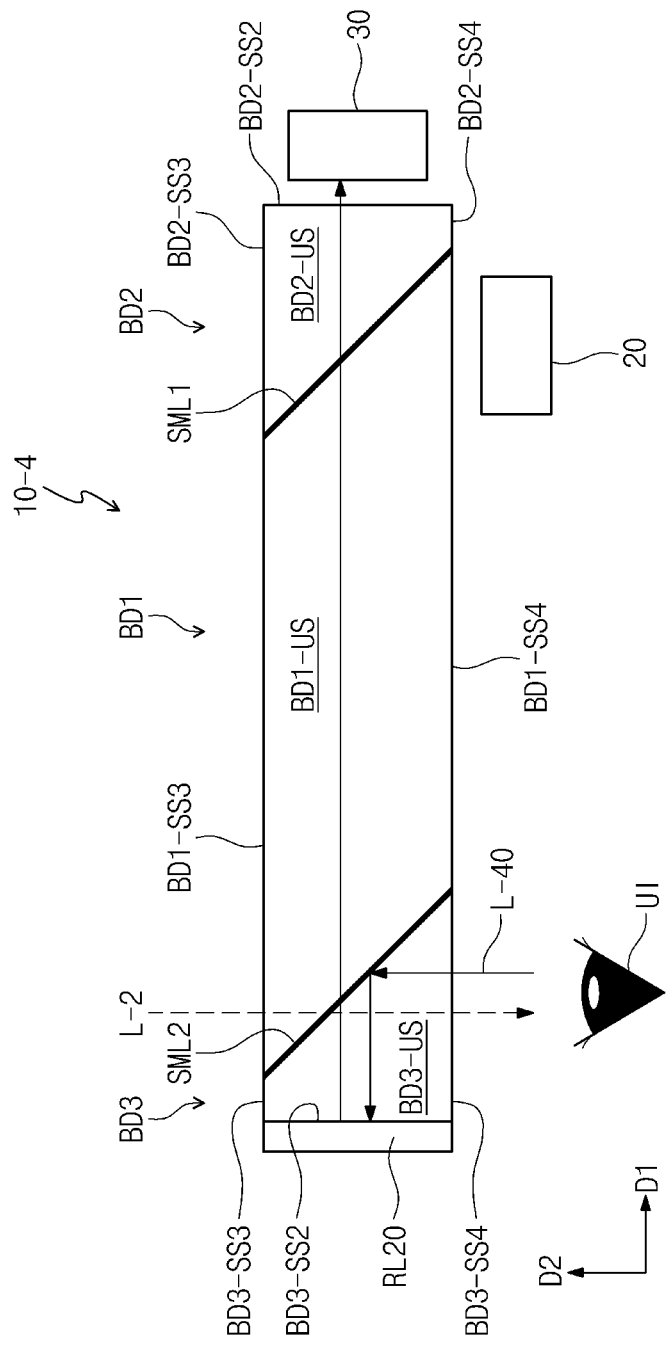

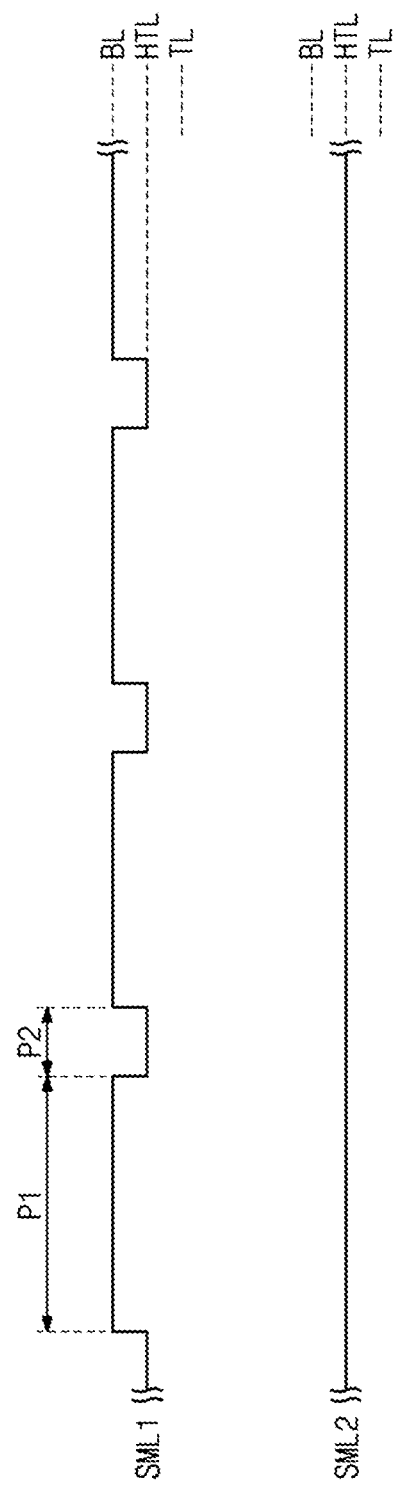

HEAD-WEARABLE ELECTRONIC DEVICE

CLAIM PRIORITY

This U.S. non-provisional patent application claims the priority of and all the benefits accruing under 35 U.S.C. § 119 of Korean Patent Application No. 10-2015-0007037, filed on Jan. 14, 2015, the contents of which are hereby incorporated by reference in its entirety.

BACKGROUND

1. Field of Disclosure

The present disclosure relates to a head-wearable electronic device. More particularly, the present disclosure relates to a head-wearable electronic device capable of providing an augmented reality.

2. Description of the Related Art

In recent years, various shaped mobile electronic devices have been developed. In detail, various wearable electronic devices, such as a smart watch, a head-wearable electronic device, etc., have been developed.

SUMMARY

The present disclosure provides a head-wearable electronic device capable of providing a data image to a user using a switchable mirror layer and securing reaction information of the user with respect to the data image.

Embodiments of the inventive concept provide a head-wearable electronic device including a frame wearable on a head of a user and an electro-optical device coupled to the frame. The electro-optical device includes a display module generating a data image, an optical module, and a camera module. The optical module includes a first switchable mirror layer and a second switchable mirror layer, each having a light transmittance that is controllable. The first switchable mirror layer provides the second switchable mirror layer with the data image generated by the display module and the second switchable mirror layer provides eye of the user with the data image provided from the first switchable mirror layer. The camera module provides an external image having information about the eye of the user corresponding to an operation of the first and second switchable mirror layers.

The optical module includes first, second, and third body parts. Each of the first, second, and third body parts includes an upper surface defined by a first direction and a second direction substantially perpendicular to the first direction, a rear surface spaced apart from the upper surface in a normal line direction, and a plurality of side surfaces connecting the upper surface and the rear surface.

The side surfaces of the first body part include a first diagonal surface and a second diagonal surface, the side surfaces of the second body part include a third diagonal surface facing the first diagonal surface, and the side surfaces of the third body part include a fourth diagonal surface facing the second diagonal surface.

The first switchable mirror layer is disposed between the first diagonal surface and the third diagonal surface, and the second switchable mirror layer is disposed between the second diagonal surface and the fourth diagonal surface.

The side surfaces of each of the first, second, and third body parts are substantially perpendicular to at least one of the upper surface and the rear surface.

The first and second switchable mirror layers are spaced apart from each other in the first direction, and a first imaginary surface substantially parallel to the first switchable mirror layer crosses a second imaginary surface substantially parallel to the second switchable mirror layer. The first imaginary surface and the second imaginary surface form an included angle greater than about 90 degrees.

The camera module faces one side surface of the side surfaces of the second body part, which faces the first switchable mirror layer in the first direction, and the display module faces one side surface of the side surfaces of the first body part, which faces the first switchable mirror layer in the second direction.

The first switchable mirror layer is operated in a reflective mode during first periods to provide the second switchable mirror layer with the data image generated by the display module and operated in a transmissive mode during second periods different from the first periods to transmit the external image having the information about the eye of the user.

The camera module provides an external image in front of the user, which is reflected by the first switchable mirror layer during the first periods, and provides the external image having the information about the eye of the user during the second periods.

The second switchable mirror layer is operated in a transflective mode during the first periods and operated in the transflective mode or the reflective mode. The second periods have a time length shorter than a time length of the first periods. A transmittance of the second switchable mirror layer in the second periods is lower than a transmittance of the second switchable mirror layer in the first periods.

The optical module further includes a reflection layer disposed on one side surface of the side surfaces of the second body part, which faces the first switchable mirror layer in the first direction. The camera module is disposed on one side surface of the side surfaces of the second body part, which faces the first switchable mirror layer in the second direction, and the display module faces one side surface of the side surfaces of the first body part, which faces the first switchable mirror layer in the second direction.

The first switchable mirror layer is operated in a reflective mode during the first periods to provide the data image to the second switchable mirror layer and operated in a transflective mode during second periods different from the first periods to transmit and reflect the external image having the information about the eye of the user.

The second switchable mirror layer is operated in the transflective mode during the first periods and operated in the transflective or reflective mode during the second periods. The second periods have a time length shorter than a time length of the first periods. A transmittance of the second switchable mirror layer in the second periods is lower than a transmittance of the second switchable mirror layer in the first periods.

The first switchable mirror layer is spaced apart from the second switchable mirror layer in the first direction and substantially parallel to the second switchable mirror layer.

The optical module further includes a reflection layer disposed on one side surface of the side surfaces of the third body part, which faces the second switchable mirror layer in the first direction. The camera module is disposed on one side surface of the side surfaces of the second body part, which faces the first switchable mirror layer in the first direction, and the display module faces one side surface of the side surfaces of the first body part, which faces the first switchable mirror layer in the second direction.

The first switchable mirror layer is operated in a reflective mode during the first periods to provide the data image to the second switchable mirror layer and operated in a transmissive mode during second periods different from the first periods to transmit the external image having the information about the eye of the user.

The camera module provides an external image in front of the user, which is reflected by the first switchable mirror layer during the first periods, and provides the external image having the information about the eye of the user during the second periods.

The second switchable mirror layer is operated in the transflective mode during the first periods and the second periods. The second periods have a time length shorter than a time length of the first periods.

The optical module further includes a first reflection layer disposed on one side surface of the side surfaces of the second body part, which faces the first switchable mirror layer in the first direction, and a second reflection layer disposed on one side surface of the side surfaces of the third body part, which faces the second switchable mirror layer in the first direction. The camera module is disposed on one side surface of the side surfaces of the second body, which faces the first switchable mirror layer in the second direction, and the display module faces one side surface of the side surfaces of the first body part, which faces the first switchable mirror layer in the second direction.

The first switchable mirror layer is operated in a reflective mode during first periods to provide the data image to the second switchable mirror layer and operated in a transflective mode during second periods to transmit and reflect the external image having the information about the eye of the user.

The second switchable mirror layer is operated in the transflective mode during the first periods and the second periods.

The second periods have a time length shorter than a time length of the first periods.

The first diagonal surface and the third diagonal surface form a predetermined first gap and the second diagonal surface and the fourth diagonal surface form a predetermined second gap.

The first switchable mirror layer is disposed on at least one of the first diagonal surface and the third diagonal surface and the second switchable mirror layer is disposed on at least one of the second diagonal surface and the third diagonal surface.

Each of the first and second switchable mirror layers includes a magnesium-nickel alloy and an oxygen or a hydrogen is supplied into each of the first and second gaps to control a transmittance of a corresponding switchable mirror layer of the first and second switchable mirror layers.

The optical module further includes a housing to seal the first and second gaps. The housing is provided with an inlet into which the oxygen or the hydrogen is supplied and an outlet from which the oxygen or the hydrogen is discharged.

The head-wearable electronic device further includes a communication module that transmits/receives a wireless signal to/from an external electronic device. The external electronic device includes a mobile phone, a personal computer, a smart watch, and a wireless internet router.

According to the above, the head-wearable electronic device provides the external image having the information about the eye of the user corresponding to the operation of the switchable mirror layers. The camera module provides the information about the eye, i.e., a position of the crystalline lens, a size of pupil, etc. The control module provides reaction information of the user with respect to the data image on the basis of the information about the eye. In addition, the camera module provides the external image in front of the user corresponding to the operation of the switchable mirror layers.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIGS. 3E and 3F are plan view showing an optical module according to an exemplary embodiment of the present disclosure;

FIG. 4C is a timing diagram showing an operation of a switchable mirror layer to carry out the first and second operations of the electro-optical device according to an exemplary embodiment of the present disclosure;

FIG. 5 is a plan view showing an electro-optical device according to an exemplary embodiment of the present disclosure;

FIG. 6A is a view showing a first operation of the electro-optical device shown in FIG. 5;

FIG. 6C is a timing diagram showing an operation of a switchable mirror layer to carry out the first and second operations of the electro-optical device shown in FIG. 5;

FIG. 8B is a view showing a second operation of the electro-optical device shown in FIG. 7;

FIG. 10C is a timing diagram showing an operation of a switchable mirror layer to carry out the first and second operations of the electro-optical device shown in FIG. 9.

DETAILED DESCRIPTION

Figure 1:
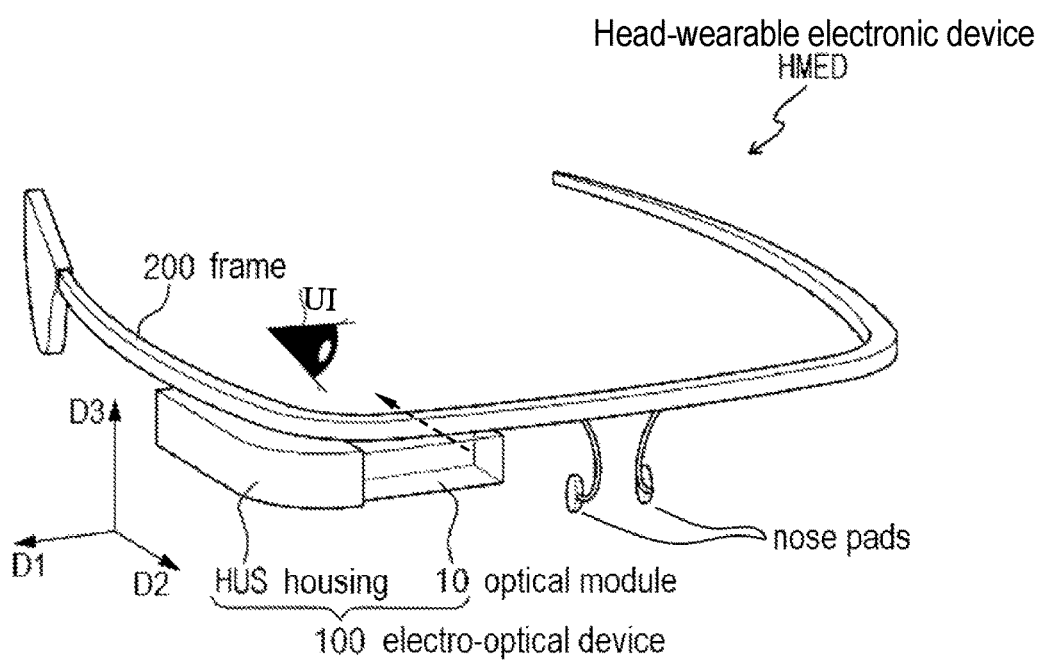
FIG. 1 is an oblique view showing a head-wearable electronic device according to an exemplary embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
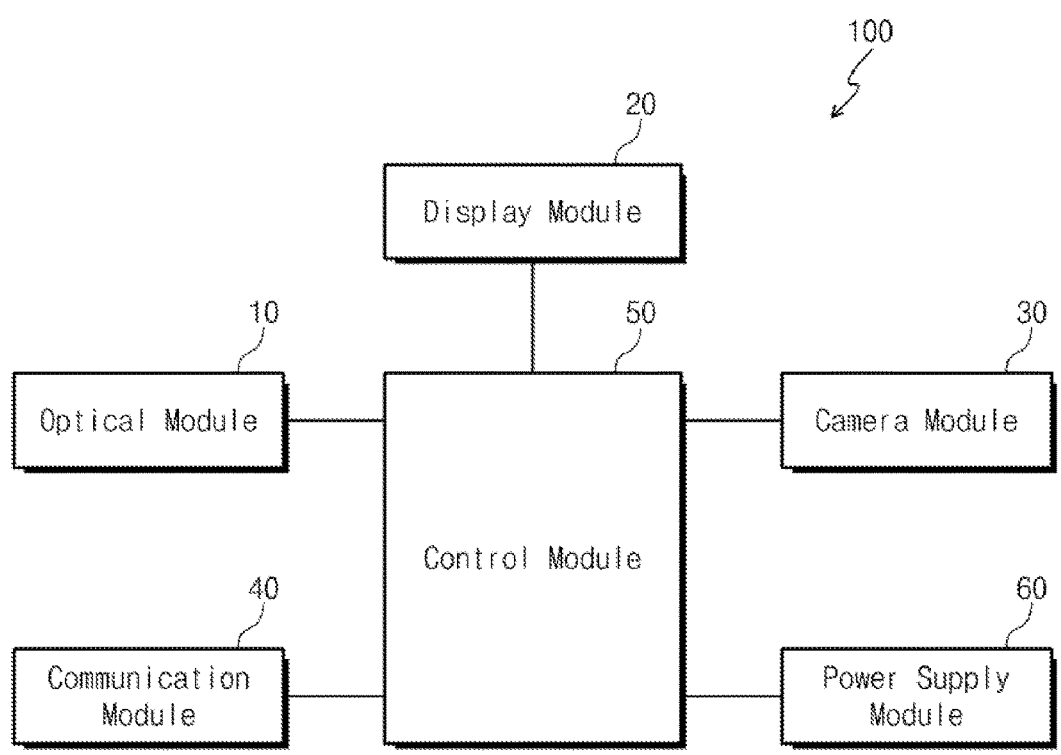
FIG. 2 is a block diagram showing an electro-optical device according to an exemplary embodiment of the present disclosure.

FIG. 1 is an oblique view showing a head-wearable electronic device HMED according to an exemplary embodiment of the present disclosure and FIG. 2 is a block diagram showing an electro-optical device 100 according to an exemplary embodiment of the present disclosure. Hereinafter, the head-wearable electronic device HMED will be described in detail with reference to FIGS. 1 and 2.

Referring to FIG. 1, the head-wearable electronic device HMED includes an electro-optical device 100 and a frame 200 that may be either worn or mounted on a head of a user. The electro-optical device 100 is coupled to the frame 200. The electro-optical device 100 includes a housing HUS coupled to the frame 200. The electro-optical device is attachable to and detachable from the frame 200.

The frame 200 has a function of an eyeglass or sunglasses frame. The frame 200 is supported by ears and a nose of the user. In the present exemplary embodiment, the head-wearable electronic device HMED may further include lenses coupled to the frame, which are used for glasses or sunglasses.

The electro-optical device 100 is coupled to the frame 200 to allow an operating position thereof to be variable with respect to the frame 200. That is, the electro-optical device 100 is not fixed to the frame 200 and is operated to indicate various directions while being attached to the frame 200. A structure required to couple the electro-optical device 100 to the frame 200 should not be limited to a specific structure. For instance, the structure may be a hinge structure or an arm structure including a plurality of joints.

Referring to FIG. 2, the electro-optical device 100 includes an optical module 10, a display module 20, a camera module 30, a communication module 40, a control module 50, and a power supply module 60, but a configuration of the electro-optical device 100 should not be limited thereto or thereby. The electro-optical device 100 may further include an external interface, e.g., an external recharger, a wire/wireless data port, a card socket (a memory card, a SIM/UIM card), etc., and a memory storing image data and sound data.

FIG. 1 shows the electro-optical device 100 in which the display module 20, the camera module 30, the communication module 40, the control module 50, and the power supply module 60 are accommodated in the housing HUS. The optical module 10 is exposed to the outside of the housing HUS.

The optical module 10 includes a first switchable mirror layer and a second switchable mirror layer, each in which a light transmittance thereof is controlled. Each of the first and second switchable mirror layers is operated in a transmissive mode, a transflective mode, or a reflective mode.

Each of the first and second switchable mirror layers transmits the light incident thereto in the transmissive mode, reflects the light incident thereto in the reflective mode, and transmits a portion of the light incident thereto and reflects the other portion of the light incident thereto in the transflective mode. The terms of "the portion of the incident light is transmitted in the transflective mode" means that a brightness of the transmitted light is relatively lower than a brightness of the incident light.

For instance, when about 80% or more of the incident light is reflected, each of the first and second switchable mirror layers is defined as being operated in the reflective mode. When about 40% to about 60% of the incident light is reflected or transmitted, each of the first and second switchable mirror layers is defined as being operated in the transflective mode. When about 80% or more of the incident light is transmitted, each of the first and second switchable mirror layers is defined as being operated in the transmissive mode. The first and second switchable mirror layers will be described in detail later.

The data images generated by the display module 20 are provided to eye of the user according to the operation of the first and second switchable mirror layers. In addition, the camera module 30 provides an external image having information about the eye of the user by virtue of the operation of the first and second switchable mirror layers. Further, the user provides the data image displayed to be overlapped with an external image in front of the user according to the operation of the first and second switchable mirror layers. Accordingly, the electro-optical device 100 provides the user with an augmented reality.

The display module 20 includes a display panel and a control circuit to control the display panel. The display panel is a liquid crystal display panel or an organic light emitting display panel, but it should not be limited thereto or thereby. The display module 20 includes a Fresnel lens to control a focus of the data images provided from the display panel.

The camera module 30 includes a lens, a filter, and an image sensor. In addition, the camera module 30 includes a control circuit to control an operation of the image sensor.

The communication module 40 transmits/receives a wireless signal originated from a source of the wireless signal using a Bluetooth connection or a WiFi connection. The communication module 40 includes a transmission circuit that modulates the wireless signal to be transmitted and a receiving circuit that demodulates the wireless signal to be received. The communication module 40 includes an external communication module to transmit/receive the wireless signal to/from an external electronic device and an internal communication module to transmit/receive the wireless signal to/from internal elements in the electro-optical device 100. For instance, the external communication module includes a Bluetooth module that transmits/receives the wireless signal to/from a mobile phone, a smart watch, and a personal computer and a WiFi module that transmits/receives an internet signal to/from a wireless router. The internal communication module includes a first local area communication circuit included in the camera module 30 and a second local area communication circuit connected to the control module 50. The camera module 30 applies an external image to the second local area communication circuit connected to the control module 50 through the first local area communication circuit. The first and second local area communication circuits include a Bluetooth communication circuit or a Zigbee communication circuit. The display module 20 further includes a local area communication circuit.

The control module 50 controls the operation of the electro-optical device 100. For instance, the control module 50 activates or deactivates the optical module 10, the display module 20, the camera module 30, and the communication module 40. The control module 50 includes at least one microprocessor.

The control module 50 extracts information about eye of the user from the external image provided from the camera module 30. Reaction information of the user against the data images are obtained from the information about eye of the user. The control module 50 provides a position of the crystalline lens with respect to the data images providing information to check mainly-interested information of the user with respect to the information. In addition, the control module 50 provides information about a size of pupil of the user's eye to check emotion of the user with respect to the data images.

The power supply module 60 supplies power required to drive the overall operation of the electro-optical device 100. The power supply module 60 includes a disposable battery or a rechargeable battery, such as a lithium-ion or nickel-cadmium battery.

Figure 3A:
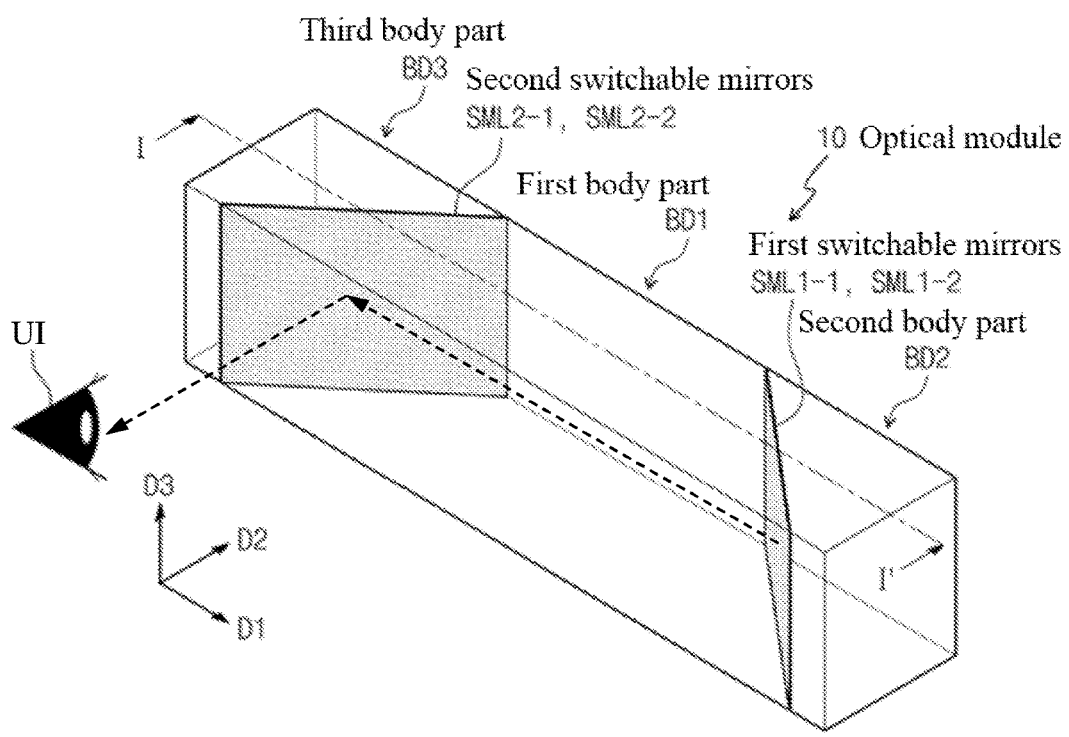
FIG. 3A is an oblique view showing an optical module according to an exemplary embodiment of the present disclosure.
Figure 3B:
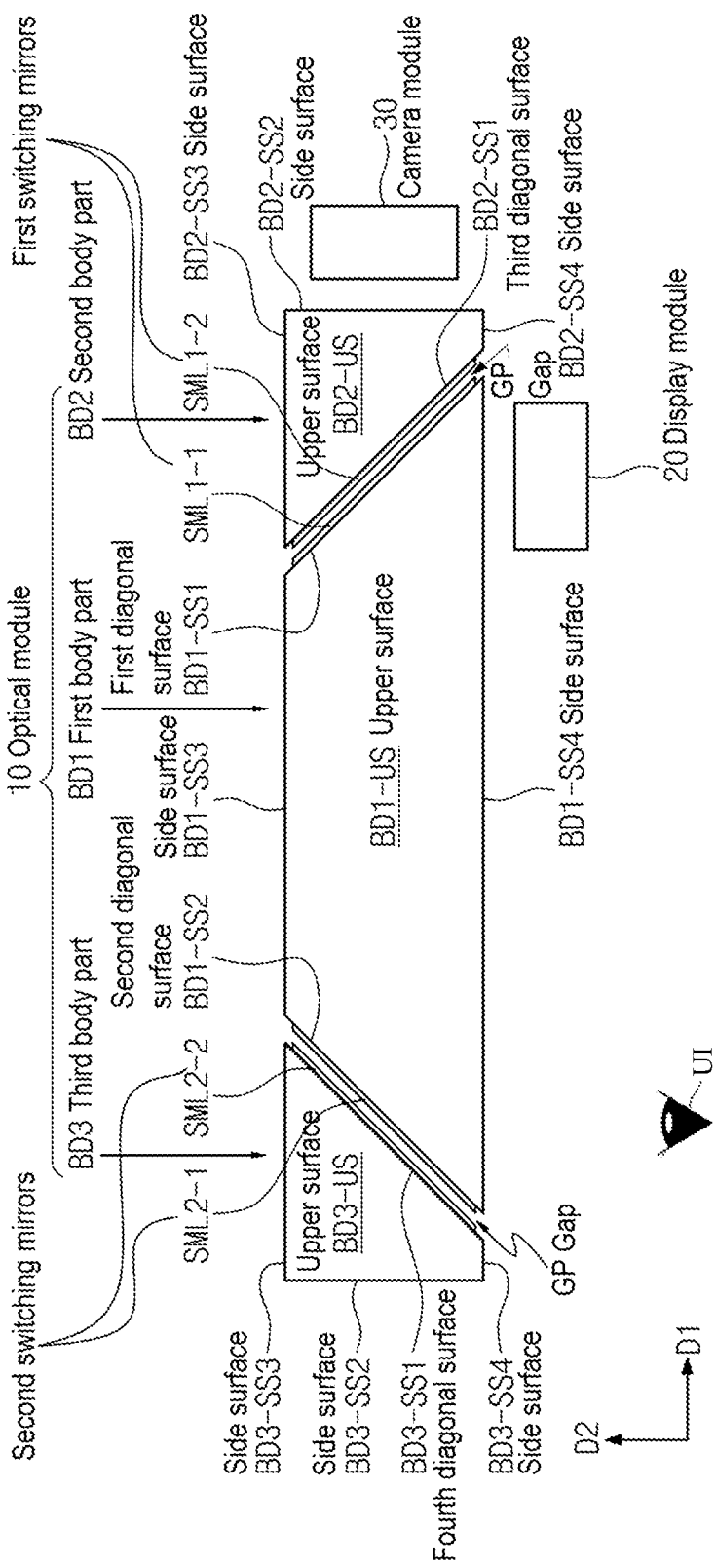
FIG. 3B is a plan view showing the optical module shown in FIG. 3A.
Figure 3C:
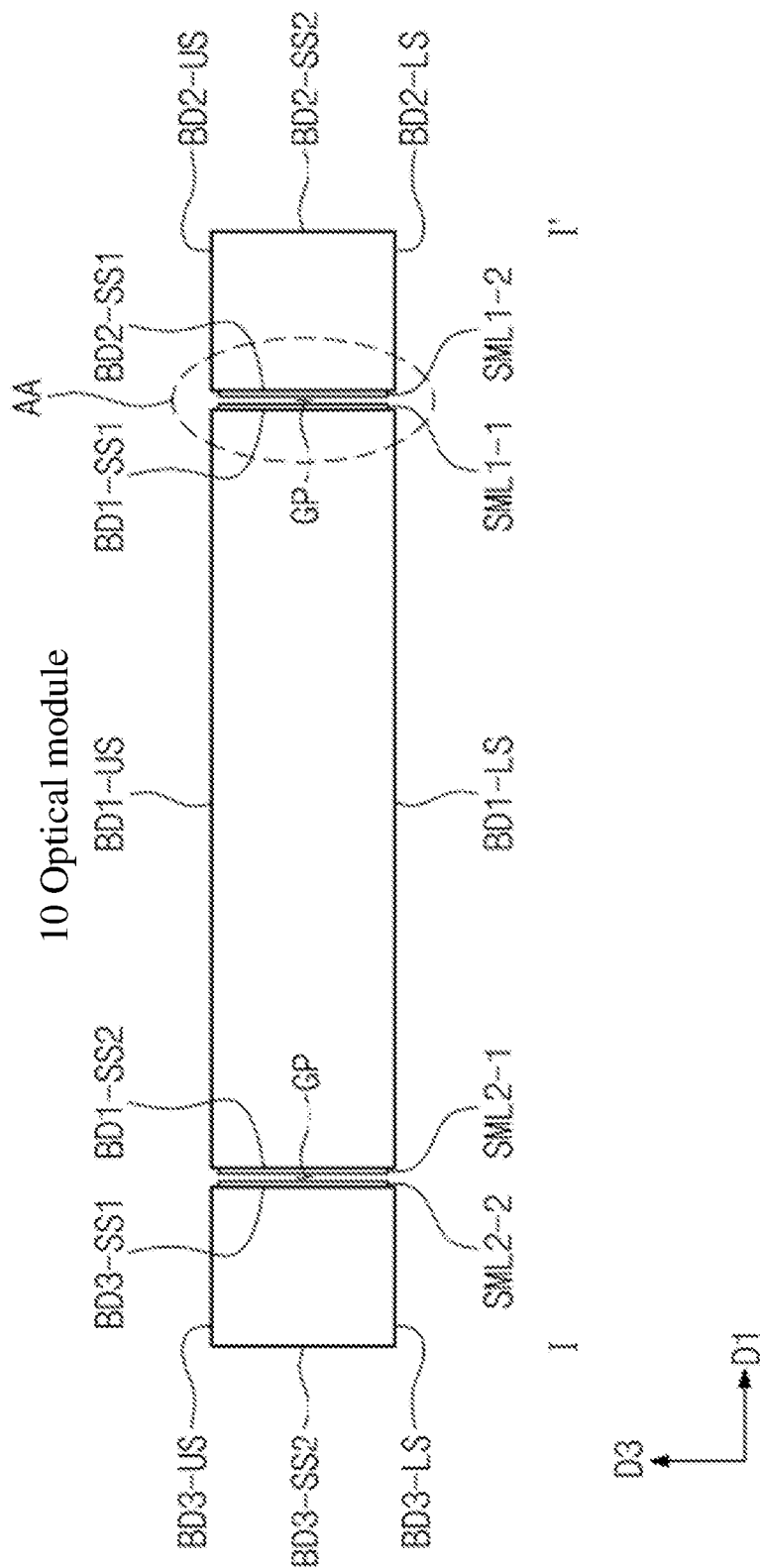
FIG. 3C is a cross-sectional view take along a line I-I' of FIG. 3A.
Figure 3D:
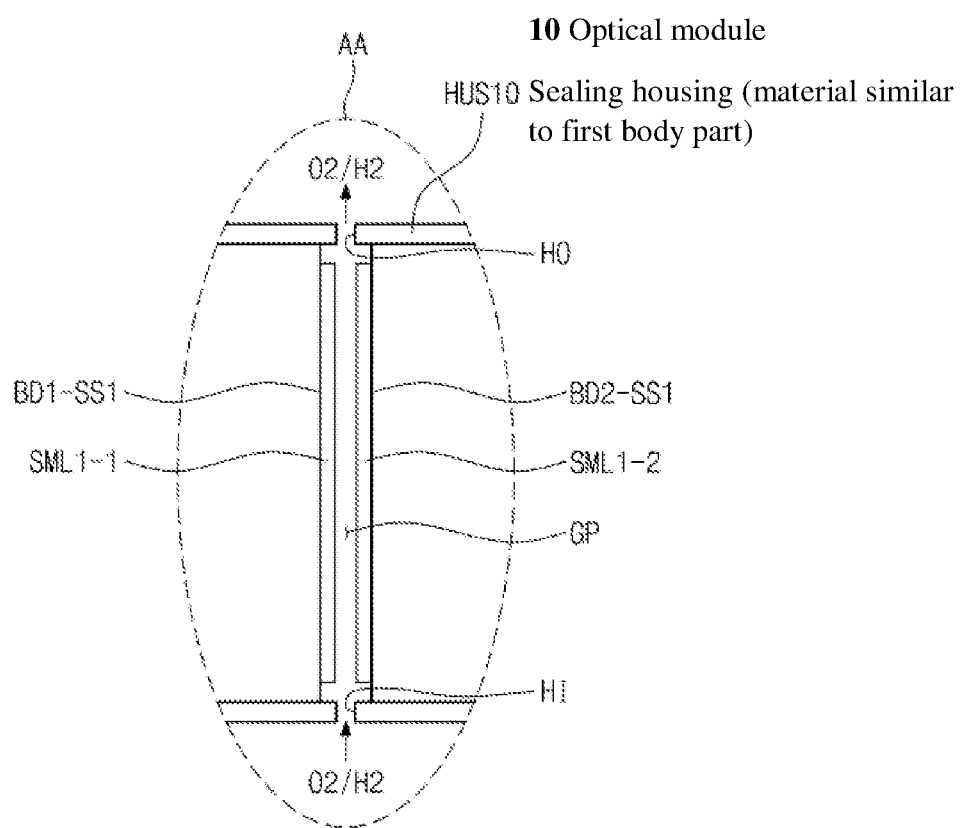
FIG. 3D is a partially enlarged view showing a portion of the optical module shown in FIG. 3C.
Figure 3E:
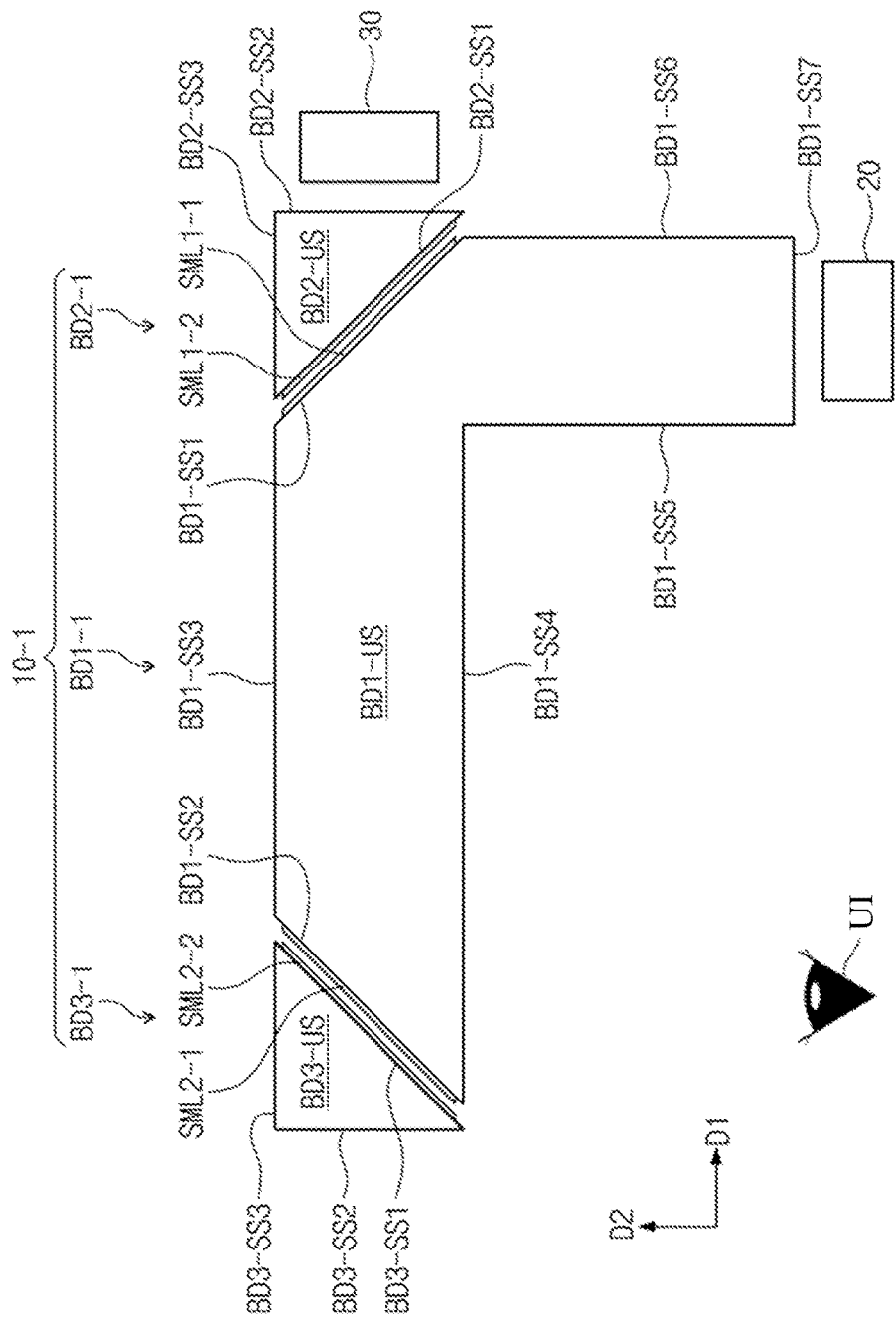

FIG. 3A is an oblique view showing an optical module according to an exemplary embodiment of the present disclosure, FIG. 3B is a plan view showing the optical module shown in FIG. 3A, FIG. 3C is a cross-sectional view take along a line I-I' of FIG. 3A, FIG. 3D is a partially enlarged view showing a portion of the optical module shown in FIG. 3C, and FIGS. 3E and 3F are plan view showing an optical module according to an exemplary embodiment of the present disclosure. Hereinafter, the optical module 10 will be described in detail with reference to FIGS. 3A to 3F. In the following descriptions, first and second directions D1 and D2, which are substantially perpendicular to each other, define upper surfaces US and rear surfaces LS of the optical module 10 and a third direction D3 indicates a thickness direction of the optical module 10 (e.g. FIG. 3B). In other words, the third direction D3 corresponds to a normal line direction of a plane surface defined by the first and second directions D1 and D2.

Referring to FIGS. 3A to 3D, the optical module 10 includes a first body part BD1, a second body part BD2, and a third body part BD3. Each of the first, second, and third body parts BD1, BD2, and BD3 includes a transparent material, e.g., glass or plastic. The first, second, and third body parts BD1, BD2, and BD3 are coupled to and separated from each other.

The first, second, and third body parts BD1, BD2, and BD3 include upper surfaces BD1-US, BD2-US, and BD3-US, rear surfaces BD1-LS, BD2-LS, and BD3-LS, and a plurality of side surfaces BD1-SS1 to BD1-SS4, BD2-SS1 to BD2-SS4, and BD3-SS1 to BD3-SS4, respectively. The side surfaces BD1-SS1 to BD1-SS4, BD2-SS1 to BD2-SS4, and BD3-SS1 to BD3-SS4 of the first, second, and third body parts BD1, BD2, and BD3 may be substantially perpendicular to at least one of the upper surfaces BD1-US, BD2-US, and BD3-US, rear surfaces BD1-LS, BD2-LS, and BD3-LS.

In the present exemplary embodiment, each of the first, second, and third body parts BD1, BD2, and BD3 form a substantially quadrangular column shape defined by corresponding side surfaces among four side surfaces BD1-SS1 to BD1-SS4, BD2-SS1 to BD2-SS4, and BD3-SS1 to BD3-SS4, but the shape of the first, second, and third body parts BD1, BD2, and BD3 should not be limited to the quadrangular column shape. In the present exemplary embodiment, the optical module 10 formed by assembling the first, second, and third body parts BD1, BD2, and BD3 has a substantially rectangular column, or elongated shape in which a length in the first direction D1 is longer than a length in the second direction D2, but it should not be limited thereto or thereby.

The communication module 40 (FIG. 3C) and the control module 50 (FIG. 3C) may be disposed on the upper surfaces BD1-US, BD2-US, and BD3-US or the rear surfaces BD1-LS, BD2-LS, and BD3-LS of the first, second, and third body parts BD1, BD2, and BD3 after being wearable on a circuit board. The power supply module 60 (FIG. 3C) may be disposed on the upper surfaces BD1-US, BD2-US, and BD3-US or the rear surfaces BD1-LS, BD2-LS, and BD3-LS of the first, second, and third body parts BD1, BD2, and BD3. In this case, the housing HUS (refer to FIG. 1) may be deformed to cover the circuit board. Positions of the communication module 40, the control module 50, and the power supply module 60 should not be limited to specific positions.

Referring to FIGS. 3B and 3C, the first body part BD1 includes a first diagonal surface BD1-SS1, a second diagonal surface BD1-SS2, a first connection surface BD1-SS3, and a second connection surface BD1-SS4. The first and second diagonal surfaces BD1-SS1 and BD1-SS2 are longitudinally opposite from and face each other in the first direction D1 and the first and second connection surface BD1-SS3 and BD1-SS4 are spaced apart from and face each other in the second direction D2.

The second body part BD2 includes a diagonal surface BD2-SS1 (hereinafter, referred to as a third diagonal surface), a first connection surface BD2-SS2, a second connection surface BD2-SS3, and a third connection surface BD2-SS4. The third diagonal surface BD2-SS1 faces the first diagonal surface BD1-SS1 and is substantially parallel to the first diagonal surface BD1-SS1. The third diagonal surface BD2-SS1 is spaced-apart from and faces the first connection surface BD2-SS2 in the first direction D1, and the second connection surface BD2-SS3 is laterally opposite from and faces the third connection surface BD2-SS4 in the second direction D2.

The second body part BD3 includes a diagonal surface BD3-SS1 (hereinafter, referred to as a fourth diagonal surface), a first connection surface BD3-SS2, a second connection surface BD3-SS3, and a third connection surface BD3-SS4. The fourth diagonal surface BD3-SS1 faces the third diagonal surface BD2-SS1. The first connection surface BD3-SS2 faces the fourth diagonal surface BD3-SS1 is spaced apart from and faces the first connection surface BD3-SS2 in the first direction D1 and the second connection surface BD3-SS3 faces and is laterally opposite from the third connection surface BD3-SS4 in the second direction D2.

The first and third diagonal surfaces BD1-SS1 and BD2-SS1 form a predetermined gap GP. The first switchable mirror layers SML1-1 and SML1-2 are disposed between the first and third diagonal surfaces BD1-SS1 and BD2-SS1. The first switchable mirror layers SML1-1 and SML1-2 are respectively disposed on the first and third diagonal surfaces BD1-SS1 and BD2-SS1. In the present exemplary embodiment, one of the two first switchable mirror layers SML1-1 and SML1-2 respectively disposed on the first and third diagonal surfaces BD1-SS1 and BD2-SS1 may be omitted.

The second and fourth diagonal surfaces BD1-SS2 and BD3-SS1 form another predetermined gap GP. The second switchable mirror layers SML2-1 and SML2-2 are disposed between the second and fourth diagonal surfaces BD1-SS2 and BD3-SS1. The second switchable mirror layers SML2-1 and SML2-2 are respectively disposed on the second and fourth diagonal surfaces BD1-SS2 and BD3-SS1. In the present exemplary embodiment, one of the two second switchable mirror layers SML2-1 and SML2-2 respectively disposed on the second and fourth diagonal surfaces BD1-SS2 and BD3-SS1, may be omitted.

The first switchable mirror layers SML1-1 and SML1-2 and the second switchable mirror layers SML2-1 and SML2-2 include an electrochromic material having a transmittance according to current/voltage applied thereto, a thermochromic material having a transmittance according to a temperature, or a gasochromic material having a transmittance according to surrounding gas. The first switchable mirror layers SML1-1 and SML1-2 and the second switchable mirror layers SML2-1 and SML2-2 should not be limited to a specific material.

The display module 20 is disposed to face the second connection surface BD1-SS4 of the first body part BD1 to allow the data image to be displayed to the first pair of switchable mirror layers SML1-1 and SML1-2. The display module 20 faces a portion of the second connection surface BD1-SS4, on which the first diagonal surface BD1-SS1 is projected to the second direction D2. The camera module 30 is disposed to face the first connection surface BD2-SS2 of the second body part BD2 in the direction of P1.

Referring to FIG. 3D, in conjunction with FIGS. 3B and 3C, the first switchable mirror layers SML1-1 and SML1-2 and the second switchable mirror layers SML2-1 and SML2-2 may include a magnesium-nickel alloy that is the gasochromic material. The magnesium-nickel alloy has a transmittance increasing while being hydrogenated and decreasing while being dehydrogenated. The transmittance of the first and second switchable mirror layers SML1-1, SML1-2, SML2-1, and SML2-2 is controlled by the degree of the hydrogenation or the dehydrogenation.

The optical module 10 includes a sealing housing HUS 10 that seals the gap GP except for an inlet HI and an outlet HO. The sealing housing HUS 10 is formed of a material similar to that of the first body part BD1. Oxygen (O2) or hydrogen (H2) is supplied to the gap GP through the inlet HI and the oxygen (O2) or the hydrogen (H2) is discharged from the gap GP through the outlet HO. When hydrogen (H2) is supplied to the gap GP, the transmittance of the first switchable mirror layers SML1-1 and SML1-2 increases, and when oxygen (O2) is supplied to the gap GP, the transmittance of the first switchable mirror layers SML1-1 and SML1-2 decreases. Although not shown in figures, the optical module 10 may further include a gas supply member to supply the oxygen (O2) or the hydrogen (H2) to the gap GP.

Although not shown in figures, an optical member including a switchable mirror layer containing the electrochromic material further includes a line to apply current/voltage to the switchable mirror layer. The line is disposed on a body part. In addition, an optical member including a switchable mirror layer containing the thermochromic material further includes a heat source to apply heat energy to the switchable mirror layer.

As shown in FIGS. 3E and 3F, the optical module 10-1 and 10-2 may have various geometric and structural shapes.

Referring to FIG. 3E, an optical module 10-1 includes a portion extending in the first direction D1 and a portion extending in the second direction D2 on a flat planar surface defined by the first and second direction D1 and D2.

Side surfaces of a first body part BD1-1 include a first diagonal surface BD1-SS1, a second diagonal surface BD1-SS2, and first to fifth connection surfaces BD1-SS3 to BD1-SS7. The first diagonal surface BD1-SS1 is longitudinal opposite along direction D1 and faces the second diagonal surface BD1-SS2 in the first direction D1, and the first connection surface BD1-SS3 faces the second connection surface BD1-SS4 in the second direction D2. The third connection surface BD1-SS5 faces the fourth connection surface BD1-SS6 in the second direction D2, and the first diagonal surface BD1-SS1 faces the fifth connection surface BD1-SS7 in the second direction D2.

A second body part BD2-1 includes a third diagonal surface BD2-SS1, a first connection surface BD2-SS2, and a second connection surface BD2-SS3. The third diagonal surface BD2-SS1 faces the first diagonal surface BD1-SS1 and is substantially parallel to the first diagonal surface BD1-SS1. The first connection surface BD2-SS2 is connected to the second connection surface BD2-SS3 at right angles, and the first and second connection surfaces BD2-SS2 and BD2-SS3 are connected to the third diagonal surface BD2-SS1.

A third body part BD3-1 includes a fourth diagonal surface BD3-SS1, a first connection surface BD3-SS2, and a second connection surface BD3-SS3. The fourth diagonal surface BD3-SS1 faces the second diagonal surface BD1-SS2 and is substantially parallel to the second diagonal surface BD1-SS2. The first connection surface BD3-SS2 is connected to the second connection surface BD3-SS3, and the first and second connection surfaces BD3-SS2 and BD3-SS3 are connected to the fourth diagonal surface BD3-SS1. The first connection surface BD3-SS2 of the third body part BD3-1 faces the first connection surface BD2-SS2 of the second body part BD2-1 in the first direction D1 and is substantially parallel to the first connection surface BD2-SS2 of the second body part BD2-1.

The display module 20 is disposed to face the fifth connection surface BD1-SS7 of the first body part BD1-1 to display the data image toward the first switchable mirror layers SML1-1 and SML1-2. The fifth connection surface BD1-SS7 overlaps with a portion onto the first diagonal surface BD1-SS1 is projected in the second direction D2. The camera module 30 is disposed to face the first connection surface BD2-SS of the second body part BD2-1.

Referring to FIG. 3F, an optical module 10-2 includes a portion extending in the first direction D1 and a portion extending in the second direction D2 on a flat plane surface defined by the first and second directions D1 and D2. The first body part BD1-2 includes a first recess portion H1 in which the display module 20 is disposed and the second body part BD2-2 includes a second recess portion H2 in which the camera module 30 is disposed.

The first recess portion H1 is formed in a fifth connection surface BD1-SS70 of a first body BD1-2. The fifth connection surface BD1-SS70 includes a plurality of connection surfaces that forms the first recess portion H1. The second recess portion H2 is formed in a first connection surface BD2-SS20 of a second body BD2-2. The first connection surface BD2-SS20 includes a plurality of connection surfaces that forms the second recess portion H2.

Figure 4A:
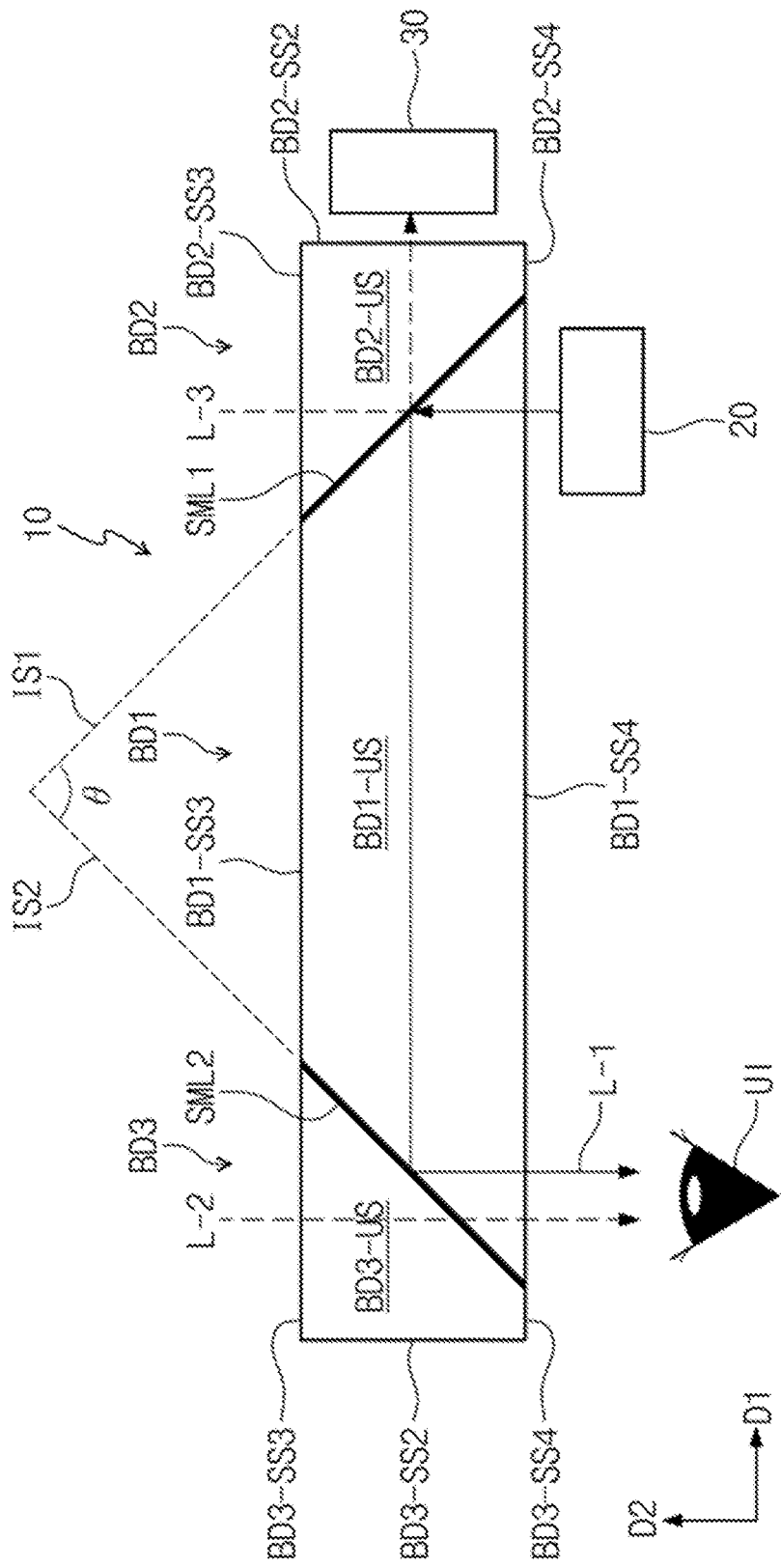
FIG. 4A is a view showing a first operation of an electro-optical device according to an exemplary embodiment of the present disclosure.
Figure 4B:
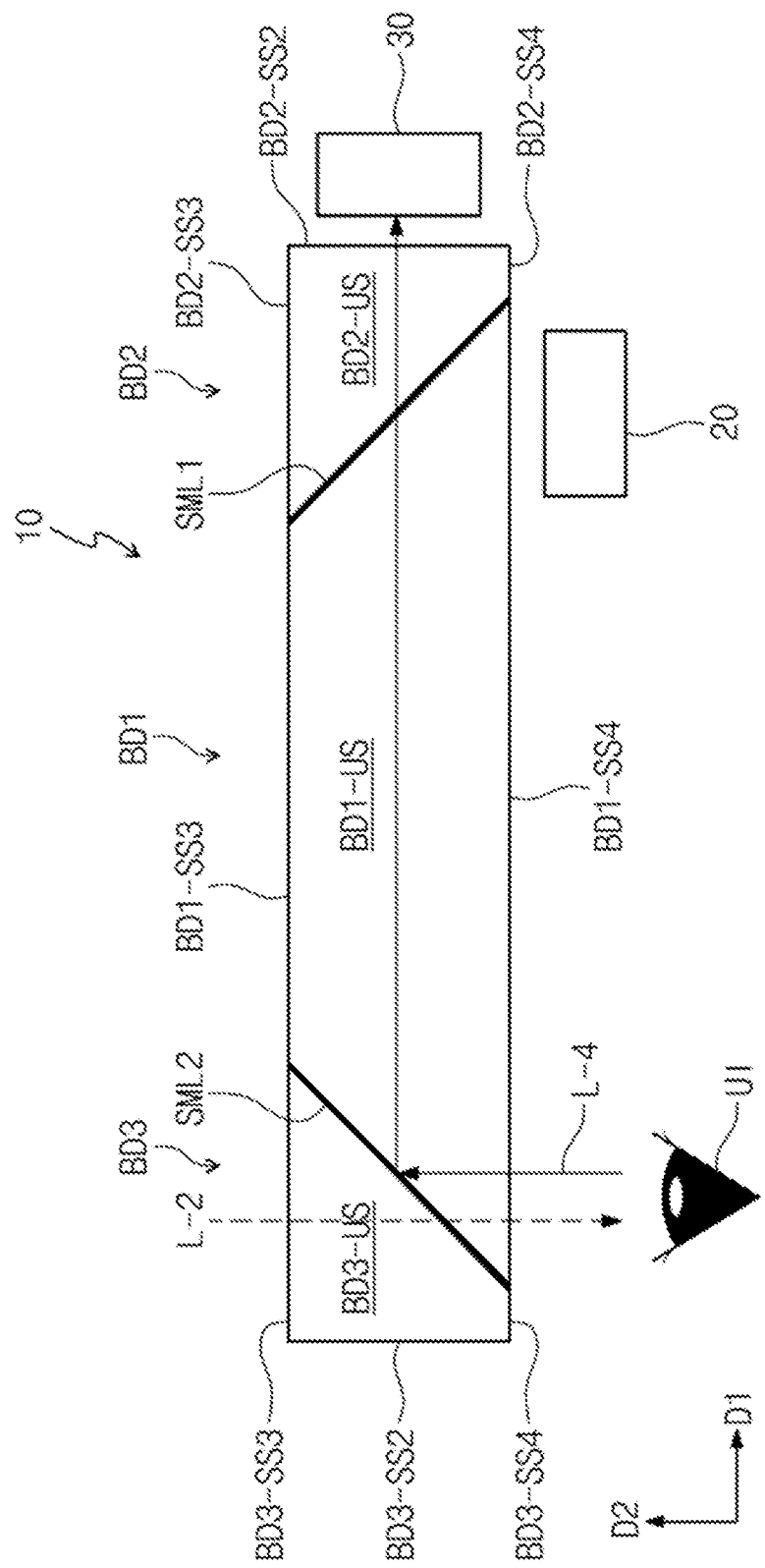
FIG. 4B is a view showing a second operation of an electro-optical device according to an exemplary embodiment of the present disclosure.

FIG. 4A is a view showing a first operation of an electro-optical device according to an exemplary embodiment of the present disclosure, FIG. 4B is a view showing a second operation of an electro-optical device according to an exemplary embodiment of the present disclosure, and FIG. 4C is a timing diagram showing an operation of a switchable mirror layer to carry out the first and second operations of the electro-optical device according to an exemplary embodiment of the present disclosure. In FIGS. 4A to 4C, the same reference numerals denote the same elements in FIGS. 1 to 3F, and thus detailed descriptions of the same elements will be omitted. The two first switchable mirror layers SML1-1 and SML1-2 shown in FIGS. 3B and 3C are replaced with one first switchable mirror SML1 and two second switchable mirror layers SML2-1 and SML2-2 shown in FIGS. 3B and 3C are replaced with one second switchable mirror SML2. In addition, the first, second, third, and fourth diagonal surfaces BD1-SS1, BD1-SS2, BD2-SS1, and BD3-SS1 are not shown in FIGS. 4A to 4C.

Referring to FIGS. 4A and 4B, the first switchable mirror layer SML1 and the second switchable mirror layer SML2 are spaced apart from each other in the first direction D1. A first imaginary surface IS1 substantially parallel to the first switchable mirror layer SML1 crosses a second imaginary surface IS2 substantially parallel to the second switchable mirror layer SML2. An included angle θ between the first and second imaginary surfaces IS1 and IS2 is greater than about 90 degrees. This is to allow the data images generated by the display module 20 to be properly applied to the eye UI of the user during first periods described later.

The first and second switchable mirror layers SML1 and SML2 are operated in the transmissive mode, the transflective mode, or the reflective mode set by the user during predetermined periods.

Referring to FIGS. 4A and 4C, the first switchable mirror layer SML1 is operated in the reflective mode BL during each of the first periods P1 and the second switchable mirror layer SML2 is operated in the transflective mode HTL during each of the first periods P1. The data images generated by the display module 20 during the first periods P1 are provided to the eye UI of the user through a first path L-1. The data images generated by the display module 20 are provided to the first switchable mirror layer SML1, the data images reflected by the first switchable mirror layer SML1 are provided to the second switchable mirror layer SML2, and the second switchable mirror layer SML2 transmits a portion of the data images and reflects the other portion of the data images to the eye UI of the user.

During the first periods P1, the user sees the external image in front of the user through a second path L-2. The data images provide information about the external image in front of the user. Therefore, the electro-optical device 10 provides the augmented reality to the user. The camera module 30 obtains the external image in front of the user through a third path L-3 during the first periods P1.

Referring to FIGS. 4B and 4C, the first switchable mirror layer SML1 is operated in the transmissive mode TL during each of the second periods P2 and the second switchable mirror layer SML2 is operated in the transflective mode HTL during each of the second periods P2. The eye-information image having the information about the eye UI of the user is provided to the camera module 30 through a fourth path L-4 during the second periods P2. The eye-information image is provided to the second switchable mirror layer SML2, the eye-information image reflected by the second switchable mirror layer SML2 is provided to the first switchable mirror layer SML1, and the eye-information image transmitting through the first switchable mirror layer SML1 is provided to the camera module 30.

To minimize a reduction in brightness of the eye-information image transmitting through the first switchable mirror layer SML1, the transmittance of the first switchable mirror layer SML1 is set to equal to or greater than about 90% during the second periods P2. The user still sees the external images in front of the user through the second path L-2 during the second periods P2.

Although the second switchable mirror layer SML2 is operated in the transflective mode HTL during the first and second periods P1 and P2, the transmittances of the first and second periods P1 and P2 are controlled to be different from each other. The transmittance of the second switchable mirror layer SML2 during the second periods P2 may be lower than the transmittance of the second switchable mirror layer SML2 during the first periods P1. This is to increase the reflectance of the second switchable mirror layer SML2 during the second periods P2 and to provide the eye-information image with vividness to the camera module 30.

Referring to FIG. 4C, the first periods P1 are alternately arranged with the second periods P2. Each of the second periods P2 has a time length shorter than that of each of the first periods P1. The second periods P2 have the same time length, e.g., a few microseconds (µs) to tens of microseconds (×10 µs). The first periods P1 have the same time length, e.g., a few seconds (s) to tens of seconds (×10 s).

In the present exemplary embodiment, the second switchable mirror layer SML2 may be operated in the reflective mode BL during the second periods P2 (not shown). This is to increase the reflectance of the second switchable mirror layer SML2 during the second periods P2 and to provide the eye-information image with vividness to the camera module 30. Since the time length of the second periods P2 is set to be short, the user does not recognize the operation of the second switchable mirror layer SML2 during the second periods P2. Thus, the user consecutively sees the external image in front of the user regardless of the first and second periods P1 and P2.

The display module 20 and the camera module 30 are activated during a specific period among the first and second periods P1 and P2. The display module 20 and the camera module 30 may be activated regardless of the first and second periods P1 and P2. For instance, the display module 20 may be activated during the first periods P1 and the camera module 30 may be activated during the first and second periods P1 and P2.

Figure 6B:
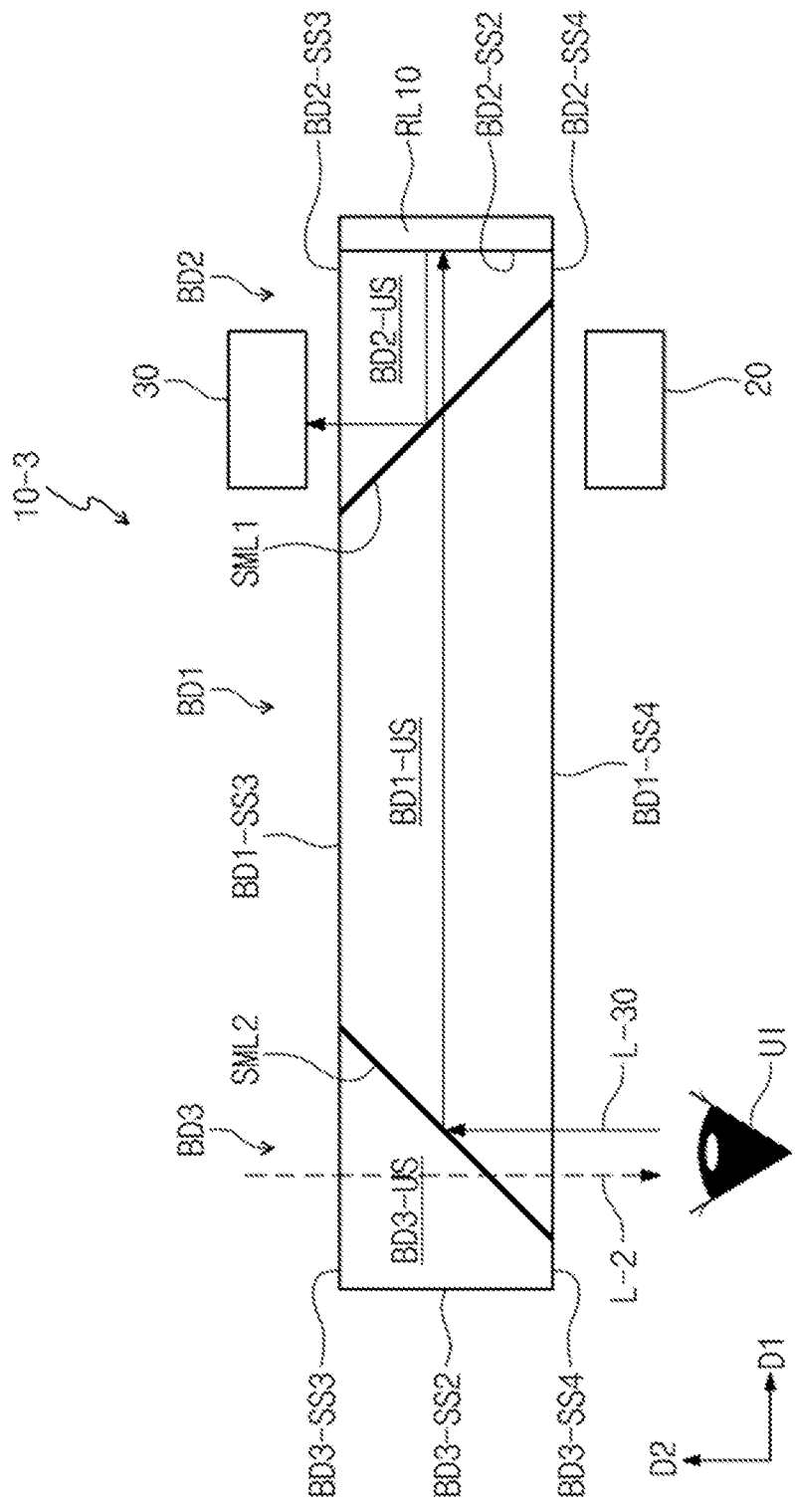
FIG. 6B is a view showing a second operation of the electro-optical device shown in FIG. 5.

FIG. 5 is a plan view showing an electro-optical device according to an exemplary embodiment of the present disclosure, FIG. 6A is a view showing a first operation of the electro-optical device shown in FIG. 5, FIG. 6B is a view showing a second operation of the electro-optical device shown in FIG. 5, and FIG. 6C is a timing diagram showing an operation of a switchable mirror layer to carry out the first and second operations of the electro-optical device shown in FIG. 5. In FIGS. 5 and 6A to 6C, the same reference numerals denote the same elements in FIGS. 1 to 4C, and thus detailed descriptions of the same elements will be omitted.

Referring to FIG. 5, an optical module 10-3 according to the present exemplary embodiment includes a first body part BD1, a second body part BD2, and a third body part BD3. A first imaginary surface IS1 substantially parallel to the first switchable mirror layer SML1 crosses a second imaginary surface IS2 substantially parallel to the second switchable mirror layer SML2.

The optical module 10-3 further includes a reflection layer RL10 disposed on a first connection surface BD2-SS2 of the second body part BD2. The first connection surface BD2-SS2 of the second body part BD2 faces the first switchable mirror layer SML1 in the first direction D1. The camera module 30 is disposed to face a second connection surface BD2-SS3 of the second body part BD2 such that the camera module 30 receives the eye-information image reflected by the first switchable mirror layer SML1. The second connection surface BD2-SS3 of the second body part BD2 faces the first switchable mirror layer SML1 in the second direction D2. The display module 20 is disposed to face a second connection surface BD1-SS4 of the first body part BD1 such that the display module 20 displays the data images toward the first switchable mirror layer SML1.

Referring to FIGS. 6A and 6C, the first switchable mirror layer SML1 is operated in the reflective mode BL during the first periods P1 and the second switchable mirror layer SML2 is operated in the transflective mode HTL during the first periods P1. The data images generated by the display module 20 during the first periods P1 are provided to the eye UI of the user through a first path L-1. The first path L-1 is substantially the same as the first path L-1 described with reference to FIG. 4A, and thus details thereof will be omitted. The user sees the external image in front of the user through a second path L-2 during the first periods P1. The data images provide information about the external image in front of the user. Accordingly, the electro-optical device 10 may provide the user with the augmented reality.

Referring to FIGS. 6B and 6C, the first switchable mirror layer SML1 is operated in the transflective mode HTL during the second periods P2 and the second switchable mirror layer SML2 is operated in the transflective mode HTL during the second periods P2. The eye-information image is provided to the camera module 30 during the second periods P2. The eye-information image is provided to the second switchable mirror layer SML2 and the second switchable mirror layer SML2 reflects a portion of the eye-information image. The portion of the eye-information image reflected by the second switchable mirror layer SML2 transmits through the first switchable mirror layer SML1. The eye-information image transmitting through the first switchable mirror layer SML1 is reflected by the reflection layer RL10, and a portion of the eye-information image reflected by the reflection layer RL10 is provided to the camera module 30 after being reflected by the first switchable mirror layer SML1. The user still sees the external images in front of the user through the second path L-2 during the second periods P2.

Although the second switchable mirror layer SML2 is operated in the transflective mode HTL during the first and second periods P1 and P2, the transmittances of the first and second periods P1 and P2 are controlled to be different from each other. In addition, the first and second switchable mirror layers SML1 and SML2 are operated in the transflective mode HTL during the second periods P2, the transmittances of the first and second switchable mirror layers SML1 and SML2 may be controlled to be different from each other.

The transmittance of the second switchable mirror layer SML2 during the second periods P2 may be lower than the transmittance of the second switchable mirror layer SML2 during the first periods P1. In addition, the transmittance of the second switchable mirror layer SML2 during the second periods P2 may be lower than the transmittance of the first switchable mirror layer SML1. This is to increase the reflectance of the second switchable mirror layer SML2 during the second periods P2 and to provide the eye-information image with vividness to the camera module 30.

When the second periods P2 are set to have a time length much shorter than that of the first periods P1, e.g., a few microseconds (µs) to tens of microseconds (×10 µs), the second switchable mirror layer SML2 may be operated in the reflective mode BL during the second periods P2. This is to increase the reflectance of the second switchable mirror layer SML2 during the second periods P2 and to provide the eye-information image with vividness to the camera module 30.

In the present exemplary embodiment, the display module 20 is activated during the first periods P1 and the camera module 30 is operated during the second periods P2. The display module 20 may be activated or deactivated during the second periods P2.

Figure 7:
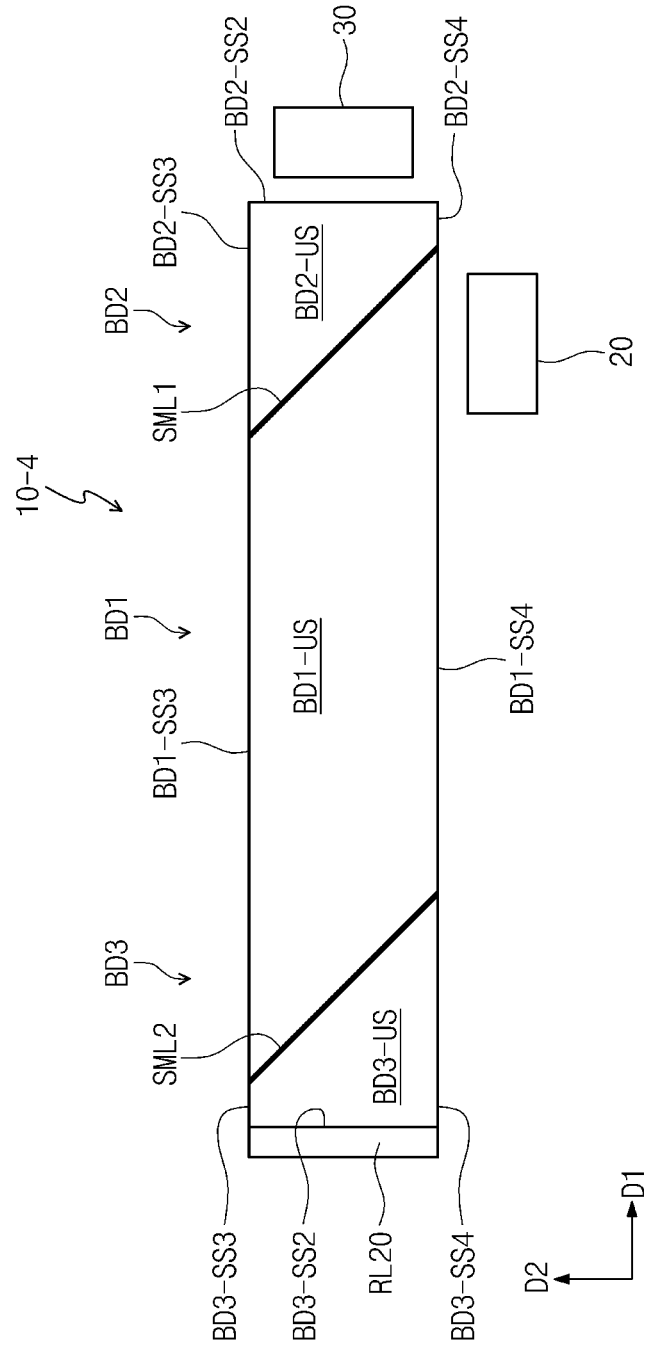
FIG. 7 is a plan view showing an electro-optical device according to an exemplary embodiment of the present disclosure.
Figure 8A:
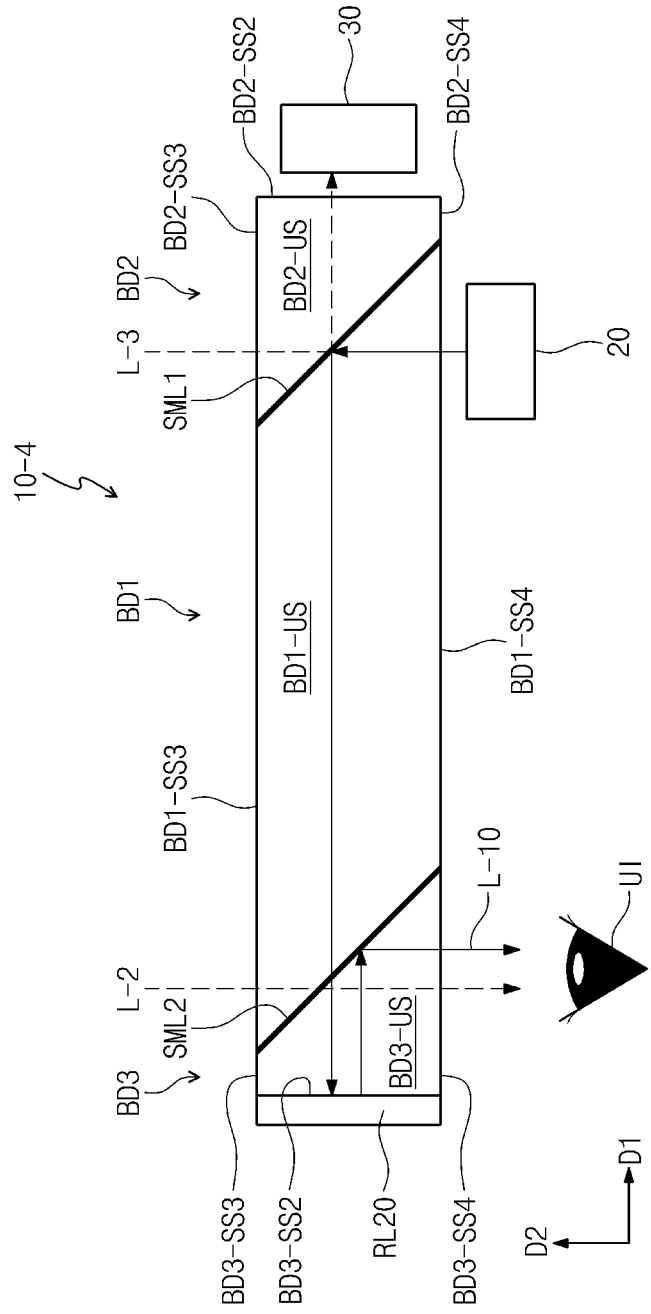
FIG. 8A is a view showing a first operation of the electro-optical device shown in FIG. 7.
Figure 8C:
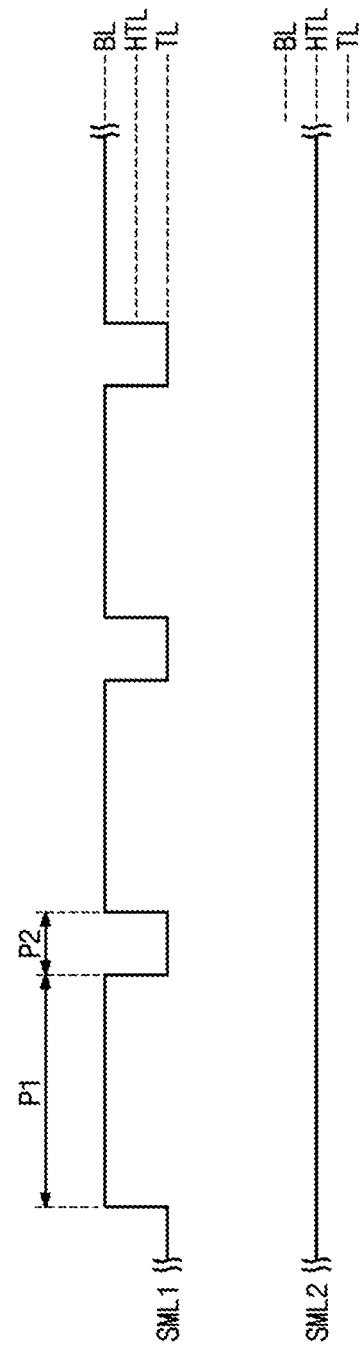
FIG. 8C is a timing diagram showing an operation of a switchable mirror layer to carry out the first and second operations of the electro-optical device shown in FIG. 7.

FIG. 7 is a plan view showing an electro-optical device according to an exemplary embodiment of the present disclosure, FIG. 8A is a view showing a first operation of the electro-optical device shown in FIG. 7, FIG. 8B is a view showing a second operation of the electro-optical device shown in FIG. 7, and FIG. 8C is a timing diagram showing an operation of a switchable mirror layer to carry out the first and second operations of the electro-optical device shown in FIG. 7. In FIGS. 7 and 8A to 8C, the same reference numerals denote the same elements in FIGS. 1 to 6C, and thus detailed descriptions of the same elements will be omitted.

Referring to FIG. 7, an optical module 10-4 according to the present exemplary embodiment includes a first body part BD1, a second body part BD2, and a third body part bD3. The first switchable mirror layer SML1 is substantially parallel to the second switchable mirror layer SML2. Although not shown in figures, first, second, third, and fourth diagonal surfaces BD1-SS1, BD1-SS2, BD2-SS1, and BD3-SS1 face each other and are substantially parallel to each other.

The optical module 10-4 further includes a reflection layer RL20 disposed on a first connection surface BD3-SS2 of the third body part BD3. The first connection surface BD3-SS2 of the third body part BD3 faces the second switchable mirror layer SML2 in the first direction D1. The camera module 30 is disposed to face a first connection surface BD2-SS2 of the second body part BD2 such that the camera module 30 receives the eye-information image transmitting through the first switchable mirror layer SML1. The first connection surface BD2-SS2 of the second body part BD2 faces the first switchable mirror layer SML1 in the first direction D1. The display module 20 is disposed to face a second connection surface BD1-SS4 of the first body part BD1 such that the display module 20 displays the data images toward the first switchable mirror layer SML1.

Although not shown in figures, the optical module 10-4 may further include a focus control member disposed on a third connection surface BD3-SS4 of the third body BD3. The focus control member includes a lens that inverts the data images reflected by the second switchable mirror layer SML2.

Referring to FIGS. 8A and 8C, the first switchable mirror layer SML1 is operated in the reflective mode BL during first periods P1 and the second switchable mirror layer SML2 is operated in the transflective mode HTL during the first periods P1. The data images generated by the display module 20 during the first periods P1 are provided to the eye UI of the user through a first path L-10. The data images generated by the display module 20 are provided to the first switchable mirror layer SML1, and the data images reflected by the first switchable mirror layer SML1 are provided to the second switchable mirror layer SML2. A portion of the data images transmitting through the second switchable mirror layer SML2 is reflected by the reflection layer RL20, and then provided to the second switchable mirror layer SML2. A portion of the data images reflected by the second switchable mirror layer SML2 is provided to the eye UI of the user.

During the first periods P1, the user sees the external image in front of the user through a second path L-2. The data images provide information about the external image in front of the user. Therefore, the electro-optical device 10 provides the augmented reality to the user.

Referring to FIGS. 8B and 8C, the first switchable mirror layer SML1 is operated in the transmissive mode TL during second periods P2 and the second switchable mirror layer SML2 is operated in the transflective mode HTL during the second periods P2. The eye-information image is provided to the camera module 30 through a fourth path L-40 during the second periods P2. The eye-information image is provided to the second switchable mirror layer SML2, and a portion of the eye-information image reflected by the second switchable mirror layer SML2 is provided to the second switchable mirror layer SML2. A portion of the eye-information image transmitting through the second switchable mirror layer SML2 is provided to the camera module 30 after passing through the first switchable mirror layer SML1.

When the second periods P2 are set to have a time length much shorter than that of the first periods P1, the second switchable mirror layer SML2 may be alternately operated in the reflective mode BL and the transmissive mode TL during the second periods P2. Each of the second periods P2 includes first sub-periods and second sub-periods. The first sub-periods are alternately arranged with the second sub-periods. The second switchable mirror layer SML2 is operated in the reflective mode BL during the first sub-period to allow the eye-information image to be provided to the reflection layer RL20, and the second switchable mirror layer SML2 is operated in the transmissive mode TL during the second sub-period following the first sub-period to transmit the eye-information image reflected by the reflection layer RL20. The eye-information image transmitting through the second switchable mirror layer SML2 is provided to the camera module 30. When the second switchable mirror layer SML2 is alternately operated in the reflective mode BL and the transmissive mode TL during the second periods P2, the brightness of the eye-information image provided to the camera module 30 is improved.

Figure 9:
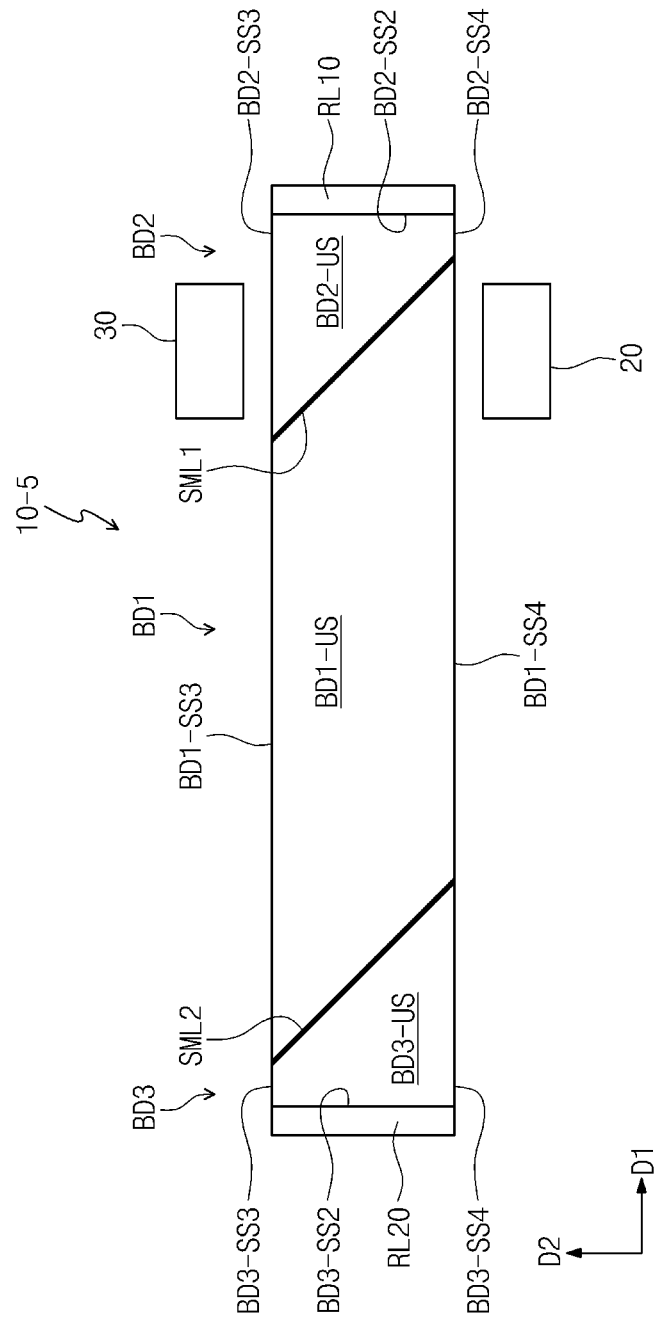
FIG. 9 is a plan view showing an electro-optical device according to an exemplary embodiment of the present disclosure.
Figure 10A:
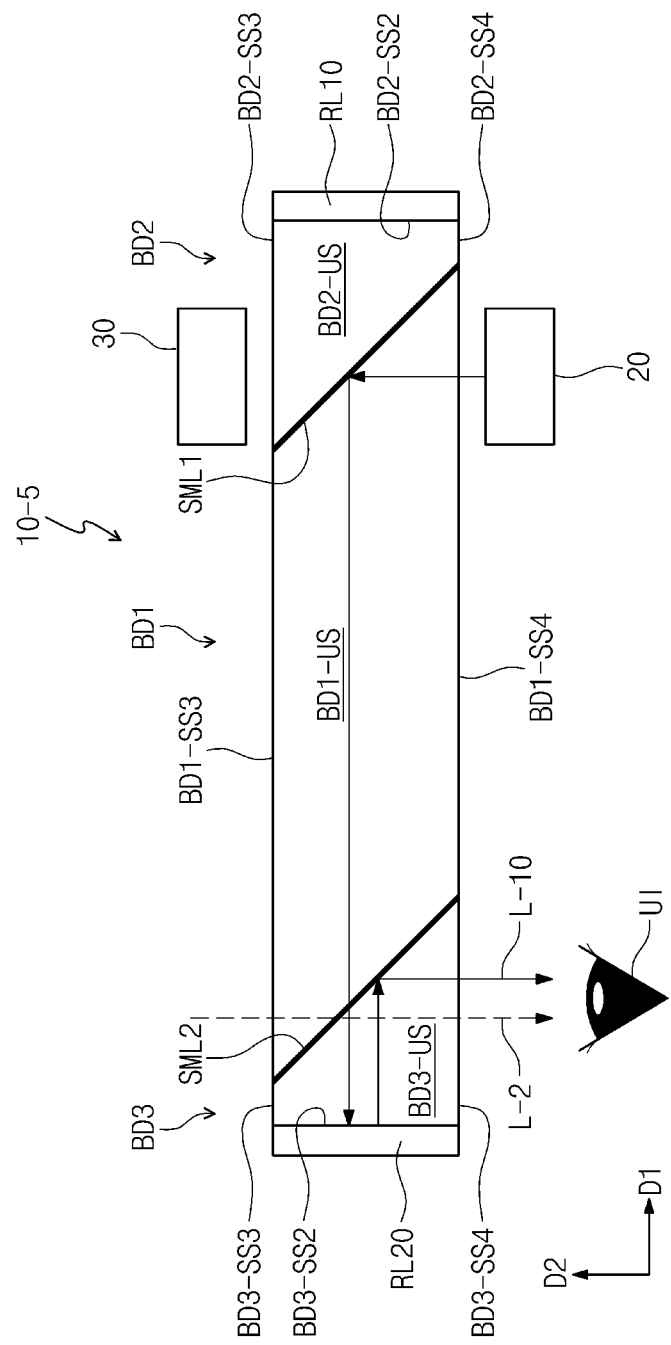
FIG. 10A is a view showing a first operation of the electro-optical device shown in FIG. 9.
Figure 10B:
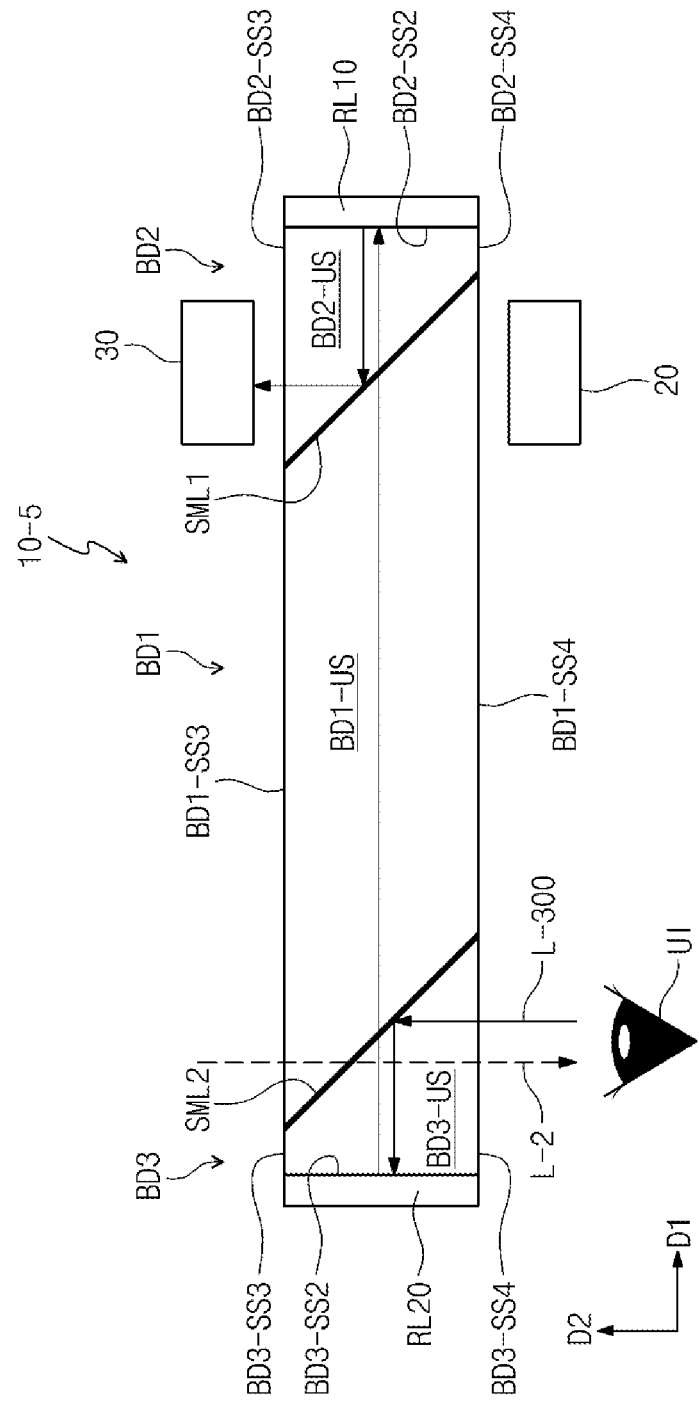
FIG. 10B is a view showing a second operation of the electro-optical device shown in FIG. 9.

FIG. 9 is a plan view showing an electro-optical device according to an exemplary embodiment of the present disclosure, FIG. 10A is a view showing a first operation of the electro-optical device shown in FIG. 9, FIG. 10B is a view showing a second operation of the electro-optical device shown in FIG. 9, and FIG. 10C is a timing diagram showing an operation of a switchable mirror layer to carry out the first and second operations of the electro-optical device shown in FIG. 9. In FIGS. 9 and 10A to 10C, the same reference numerals denote the same elements in FIGS. 1 to 8C, and thus detailed descriptions of the same elements will be omitted.

Referring to FIG. 9, an optical module 10-5 according to the present exemplary embodiment includes a first body part BD1, a second body part BD2, and a third body part BD3. A first switchable mirror layer SML1 is substantially parallel to a second switchable mirror layer SML2.

The optical module 10-5 further includes a first reflection layer RL10 disposed on a first connection surface BD2-SS2 of the second body part BD2 and a second reflection layer RL20 disposed on a first connection surface BD3-SS2 of the third body part BD3. The first connection surface BD-SS2 of the second body part BD2 faces the first switchable mirror layer SML1 in the first direction D1. The camera module 30 is disposed to face a second connection surface BD2-SS3 of the second body part BD2 such that the camera module 30 receives the eye-information image reflected by the first switchable mirror layer SML1. The second connection surface BD2-SS3 of the second body part BD2 faces the first switchable mirror layer SML1 in the second direction D2. The display module 20 is disposed to face a second connection surface BD1-SS4 of the first body part BD1 such that the display module 20 displays the data images toward the first switchable mirror layer SML1.

A first connection surface BD3-SS2 of the third body part BD3 faces the second switchable mirror layer SLM2 in the first direction D1. The first connection surface BD3-SS3 of the third body part BD3 faces the first connection surface BD2-SS2 of the second body part BD2 in the first direction D1.

Referring to FIGS. 10A and 10C, the first switchable mirror layer SML1 is operated in the reflective mode BL during the first periods P1 and the second switchable mirror layer SML2 is operated in the transflective mode HTL during the first periods P1. The data images generated by the display module 20 during the first periods P1 are provided to the eye UI of the user through a first path L-10. The first path L-10 is substantially the same as the first path L-10 described with reference to FIG. 8A, and thus details thereof will be omitted. The user sees the external image in front of the user through a second path L-2 during the first periods P1. The data images provide information about the external image in front of the user. Accordingly, the electro-optical device 10 may provide the user with the augmented reality.

Referring to FIGS. 10B and 10C, the first switchable mirror layer SML1 is operated in the transflective mode HTL during the second periods P2 and the second switchable mirror layer SML2 is operated in the transflective mode HTL during the second periods P2. The eye-information image is provided to the second switchable mirror layer SML2 and the second switchable mirror layer SML2 reflects a portion of the eye-information image. The portion of the eye-information image reflected by the second switchable mirror layer SML2 is provided to the second switchable mirror layer SML2 after being reflected by the second reflection layer RL20. The other portion of the eye-information image transmitting through the second switchable mirror layer SML2 transmits through the first switchable mirror layer SML1. In this case, the brightness of the eye-information image is reduced. A portion of the eye-information image transmitting through the first switchable mirror layer SML1 is reflected by the first reflection layer RL10, and the portion of the eye-information image reflected by the first reflection layer RL10 is provided to the camera module 30 after being reflected by the first switchable mirror layer SML1.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A head-wearable electronic device comprising:
a frame wearable on a head of a user; and
an electro-optical device coupled to the frame, the electro-optical device comprising:
a display module generating a data image;
an optical module comprising a first switchable mirror layer and a second switchable mirror layer, each of the first and second switchable mirror layers having a controllable light transmittance, the first switchable mirror layer providing the second switchable mirror layer with the data image generated by the display module and the second switchable mirror layer providing eye of the user with the data image provided from the first switchable mirror layer; and
a camera module securing an external image having information about the eye of the user corresponding to an operation of the first and second switchable mirror layers,
wherein:
the optical module comprises first, second, and third body parts, each of the first, second, and third body parts comprising:
an upper surface defined by a first direction and a second direction substantially perpendicular to the first direction;
a rear surface spaced apart from the upper surface in a line direction perpendicular to a plane defined by the first direction and the second direction; and
a plurality of side surfaces connecting the upper surface and the rear surface;
the side surfaces of the first body part comprise a first diagonal surface and a second diagonal surface;
the side surfaces of the second body part comprise a third diagonal surface facing and spaced apart from the first diagonal surface to form a predetermined first gap; and
the side surfaces of the third body part comprise a fourth diagonal surface facing and spaced apart from the second diagonal surface to form a predetermined second gap;
the first switchable mirror layer and the second switchable mirror layer are configured to be operated in a transmissive mode, a transflective mode, or a reflective mode set by the user during predetermined time periods; and
the first switchable mirror layer and the second switchable mirror layer are configured to be operated in a different operating mode from each other during first time periods.

2. The head-wearable electronic device of claim 1, wherein:
the first switchable mirror layer is disposed between the first diagonal surface and the third diagonal surface, and
the second switchable mirror layer is disposed between the second diagonal surface and the fourth diagonal surface.

3. The head-wearable electronic device of claim 2, wherein the side surfaces of each of the first, second, and third body parts are substantially perpendicular to at least one of the upper surface and the rear surface.

4. The head-wearable electronic device of claim 2, wherein:
the first and second switchable mirror layers are spaced apart from each other in the first direction, and
a first imaginary surface substantially parallel to the first switchable mirror layer crosses a second imaginary surface substantially parallel to the second switchable mirror layer.

5. The head-wearable electronic device of claim 4, wherein:
the camera module faces one side surface of the side surfaces of the second body part,
the one side surface of the side surface of the second body part faces the first switchable mirror layer in the first direction, and
the display module faces one side surface of the side surfaces of the first body part, the one side surface of the side surfaces of the first body part faces the first switchable mirror layer in the second direction.

6. The head-wearable electronic device of claim 5, wherein the first switchable mirror layer is operated in the reflective mode during the first periods to provide the second switchable mirror layer with the data image generated by the display module and operated in the transmissive mode during second periods different from the first periods to transmit the external image having the information about the eye of the user.

7. The head-wearable electronic device of claim 6, wherein the camera module provides an external image in front of the user and the external image reflected by the first switchable mirror layer during the first periods, and provides the external image having the information about the eye of the user during the second periods.

8. The head-wearable electronic device of claim 6, wherein the second switchable mirror layer is operated in the transflective mode during the first periods and operated in the transflective mode or the reflective mode in the second periods.

9. The head-wearable electronic device of claim 8, wherein the second periods have a time length shorter than a time length of the first periods.

10. The head-wearable electronic device of claim 9, wherein a transmittance of the second switchable mirror layer in the second periods is lower than a transmittance of the second switchable mirror layer in the first periods.

11. The head-wearable electronic device of claim 4, wherein the optical module further comprises a reflection layer disposed on one side surface of the side surfaces of the second body part, which faces the first switchable mirror layer in the first direction, the camera module is disposed on one side surface of the side surfaces of the second body part, which faces the first switchable mirror layer in the second direction, and the display module faces one side surface of the side surfaces of the first body part, which faces the first switchable mirror layer in the second direction.

12. The head-wearable electronic device of claim 11, wherein the first switchable mirror layer is operated in the reflective mode during the first periods to provide the data image to the second switchable mirror layer and operated in the transflective mode during second periods different from the first periods to transmit and reflect the external image having the information about the eye of the user.

13. The head-wearable electronic device of claim 12, wherein the second switchable mirror layer is operated in the transflective mode during the first periods and operated in the transflective or reflective mode during the second periods.

14. The head-wearable electronic device of claim 2, wherein the first switchable mirror layer is spaced apart from the second switchable mirror layer in the first direction and substantially parallel to the second switchable mirror layer.

15. The head-wearable electronic device of claim 14, wherein the optical module further comprises a reflection layer disposed on one side surface of the side surfaces of the third body part, which faces the second switchable mirror layer in the first direction, the camera module is disposed on one side surface of the side surfaces of the second body part, which faces the first switchable mirror layer in the first direction, and the display module faces one side surface of the side surfaces of the first body part, which faces the first switchable mirror layer in the second direction.

16. The head-wearable electronic device of claim 15, wherein the first switchable mirror layer is operated in the reflective mode during the first periods to provide the data image to the second switchable mirror layer and operated in the transmissive mode during second periods different from the first periods to transmit the external image having the information about the eye of the user.

17. The head-wearable electronic device of claim 16, wherein the camera module provides an external image in front of the user, which is reflected by the first switchable mirror layer during the first periods, and provides the external image having the information about the eye of the user during the second periods.

18. The head-wearable electronic device of claim 16, wherein the second switchable mirror layer is operated in the transflective mode during the first periods and the second periods.

19. The head-wearable electronic device of claim 14, wherein the optical module further comprises a first reflection layer disposed on one side surface of the side surfaces of the second body part, which faces the first switchable mirror layer in the first direction, and a second reflection layer disposed on one side surface of the side surfaces of the third body part, which faces the second switchable mirror layer in the first direction, the camera module is disposed on one side surface of the side surfaces of the second body, which faces the first switchable mirror layer in the second direction, and the display module faces one side surface of the side surfaces of the first body part, which faces the first switchable mirror layer in the second direction.

20. The head-wearable electronic device of claim 19, wherein the first switchable mirror layer is operated in the reflective mode during the first periods to provide the data image to the second switchable mirror layer and operated in the transflective mode during second periods to transmit and reflect the external image having the information about the eye of the user.

21. The head-wearable electronic device of claim 20, wherein the second switchable mirror layer is operated in the transflective mode during the first periods and the second periods.

22. The head-wearable electronic device of claim 2, wherein the first switchable mirror layer is disposed on at least one of the first diagonal surface and the third diagonal surface and the second switchable mirror layer is disposed on at least one of the second diagonal surface and the third diagonal surface.

23. The head-wearable electronic device of claim 22, wherein each of the first and second switchable mirror layers comprises a magnesium-nickel alloy and an oxygen or a hydrogen is supplied into each of the first and second gaps to control a transmittance of a corresponding switchable mirror layer of the first and second switchable mirror layers.

24. The head-wearable electronic device of claim 23, wherein
   the optical module further comprises a housing to seal the first and second gaps,
   the housing is provided with an inlet into which the oxygen or the hydrogen is supplied and an outlet from which the oxygen or the hydrogen is discharged.

25. The head-wearable electronic device of claim 2, further comprising a communication module performing at least one of
   transmitting a wireless signal to an external electronic device and
   receiving a wireless signal from the external electronic device.

26. A head-wearable electronic device comprising: a frame wearable on a head of a user; and
   an electro-optical device coupled to the frame, the electro-optical device comprising:
   a display module configured to generate a data image;
   a camera module securing an external image having information about eye of the user corresponding to an operation of the first and second switchable mirror layers
   an optical module comprising a first switchable mirror layer and a second switchable mirror layer, each of the first and second switchable mirror layers having a controllable light transmittance, the first switchable mirror layer configured to provide the second switchable mirror layer with the data image generated by the display module and the second switchable mirror layer configured to provide the eye of the user with the data image provided from the first switchable mirror layer, the second switchable mirror layer configured to provide the first switchable mirror layer with the external image and the first switchable mirror layer configured to transmit the external image to provide the external image to camera module, wherein:

the optical module comprises first, second, and third body parts, each of the first, second, and third body parts comprising:
- an upper surface defined by a first direction and a second direction substantially perpendicular to the first direction;
- a rear surface spaced apart from the upper surface in a line direction perpendicular to a plane defined by the first direction and the second direction; and
- a plurality of side surfaces connecting the upper surface and the rear surface;

the side surfaces of the first body part comprise a first diagonal surface and a second diagonal surface;

the side surfaces of the second body part comprise a third diagonal surface facing and spaced apart from the first diagonal surface to form a predetermined first gap; and the side surfaces of the third body part comprise a fourth diagonal surface facing and spaced apart from the second diagonal surface to form a predetermined second gap.

* * * * *